(12) United States Patent
Milne et al.

(10) Patent No.: US 11,792,244 B1
(45) Date of Patent: Oct. 17, 2023

(54) CONTROL OF PERMISSIONS ASSOCIATED WITH ANNOTATIONS IN ONLINE-CONFERENCE

(71) Applicants: SONY GROUP CORPORATION, Tokyo (JP); SONY INTERACTIVE ENTERTAINMENT LLC, San Mateo, CA (US)

(72) Inventors: James R. Milne, Ramona, CA (US); Charles McCoy, San Diego, CA (US); True Xiong, San Diego, CA (US)

(73) Assignees: SONY GROUP CORPORATION, Tokyo (JP); SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/591,932

(22) Filed: Feb. 3, 2022

(51) Int. Cl.
*G06F 15/16* (2006.01)
*H04L 65/4038* (2022.01)
*H04L 67/306* (2022.01)

(52) U.S. Cl.
CPC ........ *H04L 65/4038* (2013.01); *H04L 67/306* (2013.01)

(58) Field of Classification Search
CPC .......................... H04L 65/4038; H04L 67/306
USPC .................................................. 709/204, 206
See application file for complete search history.

(56) References Cited

U.S. PATENT DOCUMENTS

| | | | | |
|---|---|---|---|---|
| 8,214,446 | B1 * | 7/2012 | Siegel | G06Q 10/02 |
| | | | | 713/168 |
| 8,271,887 | B2 * | 9/2012 | Offer | H04L 65/1094 |
| | | | | 709/204 |
| 9,462,017 | B1 | 10/2016 | Siracusano, Jr. | |
| 10,735,690 | B2 * | 8/2020 | Nagpal | H04N 7/147 |
| 11,023,664 | B2 | 6/2021 | Dunne et al. | |
| 2004/0236830 | A1 | 11/2004 | Nelson | |
| 2017/0262419 | A1 | 9/2017 | Dunne | |
| 2017/0262420 | A1 * | 9/2017 | Dunne | G06F 40/169 |
| 2022/0174367 | A1 * | 6/2022 | Dorn | G06F 3/0482 |

* cited by examiner

*Primary Examiner* — Liang Che A Wang
(74) *Attorney, Agent, or Firm* — CHIP LAW GROUP

(57) ABSTRACT

An electronic device and a method, to control permission associated with annotations in an online conference, is provided. The electronic device receives profile information associated with each of a plurality of participants associated with the online conference to be hosted by a host of the electronic device. The electronic device grants, to a first set of participants of the plurality of participants, a permission to annotate media content to be shared during the online conference based on the profile information. The electronic device receives, from a set of electronic devices associated with the first set of participants, annotations related to the media content, based on the permission. The electronic device controls display of the received annotations and the media content on each of a first display device associated with the first electronic device and on a second display device associated with each of the set of electronic devices.

19 Claims, 8 Drawing Sheets

CONTROL OF PERMISSIONS ASSOCIATED WITH ANNOTATIONS IN ONLINE-CONFERENCE

CROSS-REFERENCE TO RELATED APPLICATIONS/INCORPORATION BY REFERENCE

None.

FIELD

Various embodiments of the disclosure relate to online conference. More specifically, various embodiments of the disclosure relate to an electronic device and a method to control permissions associated with annotations in an online conference.

BACKGROUND

Advancements in the field of information and communication technology have led to development of virtual presence software and applications. Such software and applications may facilitate administration of virtual meetings, which may enable multiple participants to join an online conference and collaborate with one another. One or more participants may share media content during the online conference and elicit responses from the other participants who may have joined the online conference. The other participants may provide responses or inputs to the shared media content as annotations to the media content through the virtual presence software or application. The administration of the virtual presence software or application to manage the shared media content and associated annotations during the online conference may be critical to the conduct of the online conference. For certain software/applications, during the conduct of the online conference, participants may need to seek permission (using one or more user interface (UI) elements of the application) to annotate from a host of the online conference. The host may further allow or deny the participants (using similar UI elements) to annotate the media content. During the online conference, such interactions related to the permissions for the annotations between the participants and the host, may cause inconvenience to the host/participants and may also affect smooth conduct of the online conference.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for control of permissions associated with annotations in an online conference, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
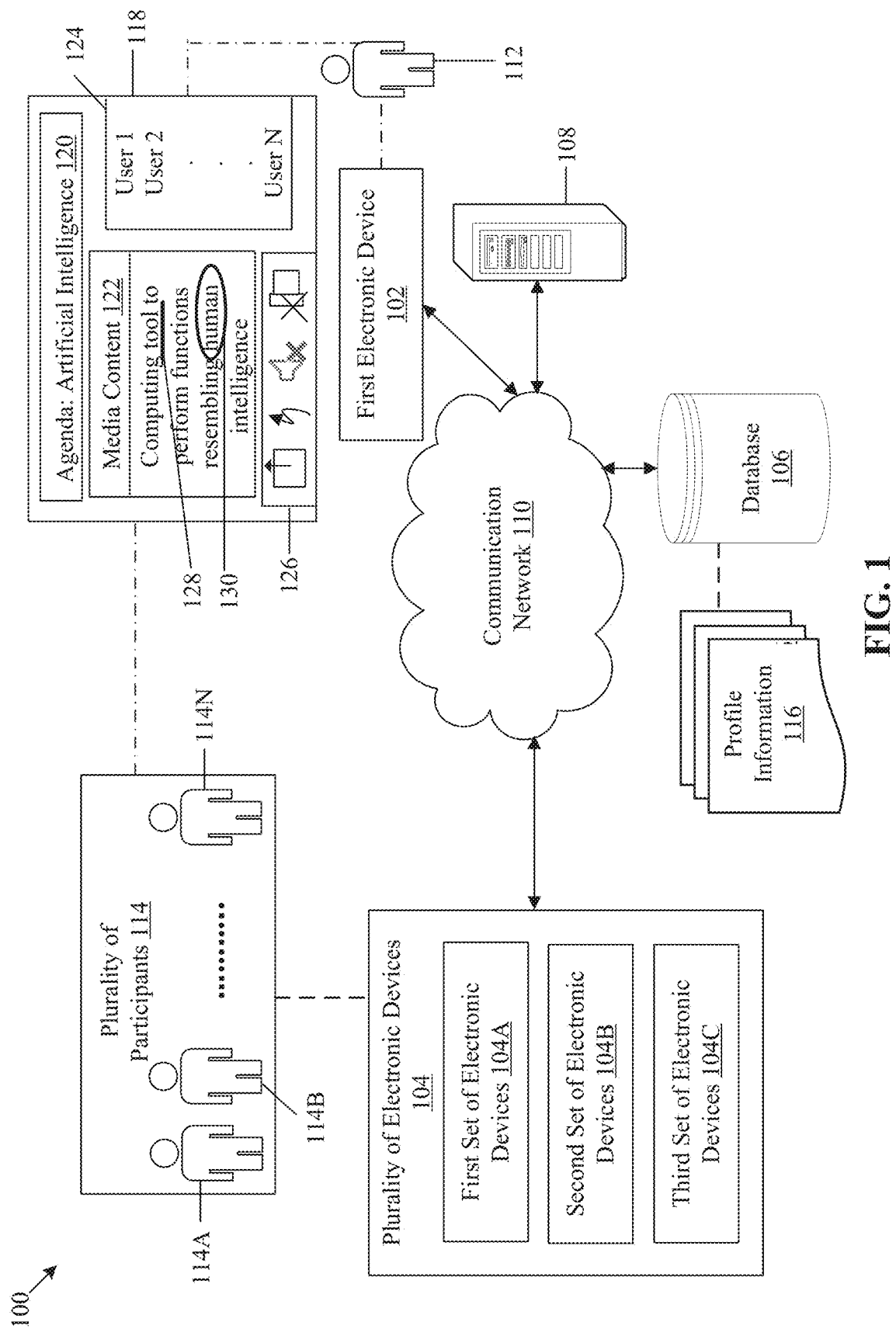
FIG. 1 is a diagram that illustrates an exemplary network environment for control of permissions associated with annotations in an online conference, in accordance with an embodiment of the disclosure.

The following described implementations may be found in the disclosed electronic device and a method for control of permissions associated with annotations in an online conference. Exemplary aspects of the disclosure provide an electronic device (for example, a mobile phone, a desktop, a laptop, and so on) that may include a virtual presence software or application. The electronic device may receive profile information that may pertain to a plurality of participants associated with an online conference that is to be organized by use of the virtual presence software or application. The online conference may be hosted by a host (i.e., a user) of the electronic device. The electronic device may grant permission (i.e., before a start of the online conference) to a first set of participants, from the plurality of participants, to annotate media content shared during the online conference. The electronic device may grant the permission to the first set of participants based on the received profile information pertaining to the first set of participants. The electronic device may further receive one or more annotations (for example, a point, a line, a circle, text, and so on) related to the media content shared during the online conference, based on the granted permission. The one or more annotations may be received from one or more of the host of the online conference associated with the electronic device, and/or from a set of electronic devices associated with the first set of participants. The electronic device may further control a display of the received one or more annotations and the media content on each of a first display device associated with the electronic device and on a second display device associated with each of a plurality of electronic devices related to the plurality of participants who joined the online conference.

Typically, during an online conference, a participant who desires to annotate shared media content may be required to manually request a host (or a presenter, or a moderator) of the online conference for a permission to annotate the media content. The host, (or the presenter, or the moderator) may have to individually grant a permission (during the online conference) to each such participant to annotate the shared media content. Conventionally, the virtual presence software or application may include multiple user interface (UI) elements (like layers of menus and sub-menus), that may enable the participant to request for the permission and/or may enable the host, the presenter, or the moderator to grant the permission to each such participant. As the host (or the presenter, or the moderator) may be required to navigate multiple UI elements (like menus and sub-menus) and individually grant the permissions to each participant who desires to annotate the media content, the conventional methods to grant the permission during the online conference may be laborious and time consuming. On the other hand, the disclosed electronic device may automatically grant permissions to annotate the media content to a set of participants of the online conference either prior to the start of the online conference or when the set of participants join the online conference. The electronic device may not require the participants to navigate through UI elements (like multiple menus) of the virtual presence software or application, during the online conference, to seek the permission to annotate the media content. Thus, the participant may not miss out on any portion of the media content that may be shared during the online conference. Also, as the presenter or the host may not be required to grant the permissions to each participant individually during the online conference, the presenter or host may not be interrupted while the media content is shared. In addition, as the profile information of the individual participants may be used to grant the permission to annotate the media content shared during the online conference, the process of the grant of the permissions may be automated and may require minimal or no input from the host or the presenter. Thus, using the disclosed electronic device, the process of the grant of the permissions may be streamlined and time/effort required to grant the permission (i.e., to annotate the shared media content) to the participants may be reduced significantly.

FIG. 1 is a diagram that illustrates an exemplary network environment for control of permissions associated with annotations in an online conference, in accordance with an embodiment of the disclosure. With reference to FIG. 1, there is shown a network environment 100. The network environment 100 may include a first electronic device 102, a plurality of electronic devices 104, a database 106, and a server 108. The first electronic device 102 may be communicatively coupled to other electronic devices, such as, the plurality of electronic devices 104, the database 106, or the server 108, through a communication network 110. The plurality of electronic devices 104 comprise a first set of electronic devices 104A, a second set of electronic devices 104B, and a third set of electronic devices 104C. There is shown a host 112 (e.g., a host participant of the online conference) who may be associated with the first electronic device 102. There is further shown a plurality of participants 114 such as, a first participant 114A, a second participant 114B, . . . , and an Nth participant 114N. The plurality of participants 114 may be associated with the online conference and with the plurality of devices 104. The database 106 may store profile information 116 of each of the plurality of participants 114 associated with the online conference.

In FIG. 1, there is further shown a user interface (UI) 118 associated with an online conference application through which the online conference may be organized. The UI 118 associated with the online conference may include a first UI element 120 that may display an agenda or a topic (such as, "Artificial Intelligence") of the online conference. Further, the UI 118 may include media content 122 that may be shared in the online conference. For example, as shown in FIG. 1, the media content 122 may include text, such as, "Computing tool to perform functions resembling human intelligence" as an introduction to the agenda "Artificial Intelligence". The UI 118 may further include a second UI element 124 that may include a list of participants (such as, "User 1", "User 2", . . . and "User N") associated with the online conference. The UI 118 may further include a set of buttons 126 to control an interaction of a participant in the online conference. For example, the set of buttons 126 may include a first button to share content, a second button to annotate content, a third button to control speaker volume, and/or a fourth button to mute/unmute a microphone in the online conference. In FIG. 1, there is further shown a first annotation 128 (for example, an underlining of the word "tool") and a second annotation 130 (for example, an encircling of the word "human") in the shared media content 122. It should be noted that the UI 118 associated with the online conference application and different annotations shown in FIG. 1 are merely for exemplary purposes and should not be construed to limit the scope of the disclosure.

The first electronic device 102 may include suitable logic, circuitry, interfaces, and/or code that may be configured to receive profile information (e.g., the profile information 116) pertaining to the plurality of participants 114 associated with the online conference. The first electronic device 102 may be further configured to grant permission (i.e., before the online conference) to a first set of participants, from the plurality of participants 114, to annotate media content (such as a presentation, a video stream, a document, an audio stream, and so) to be shared during the online conference. The first electronic device 102 may automatically grant the permission to the first set of participants based on the received profile information 116 pertaining to the first set of participants. The first electronic device 102 may be further configured to control display of one or more annotations (i.e., the first annotation 128 and the second annotation 130 as shown in FIG. 1) on a first display device associated with the first electronic device 102 and a second display device associated with each of the plurality of electronic devices 104. Examples of the first electronic device 102 may include, but are not limited to, a computing device, a desktop, a laptop, a smartphone, a cellular phone, a mobile phone, a computer workstation, and/or a consumer electronic (CE) device having a display, that may include a capability to host an application that may be configured to conduct online conferences.

The plurality of electronic devices 104 may include suitable logic, circuitry, and interfaces that may be configured to host applications that may be configured to conduct online conferences. The first set of participants may be associated with the first set of electronic devices 104A. In an embodiment, a second set of participants, included in the first set of participants, may be associated with the second set of electronic devices 104B. Herein, the second set of electronic devices 104B may be a subset of the first set of electronic devices 104A. A third set of participants may be associated with the third set of electronic devices 104C.

Also, the third set participants may be included in the first set of participants and the third set of electronic devices 104C may be a subset of the first set of electronic devices 104A. The plurality of electronic devices 104 may be further configured to enable the first set of participants (associated with the first set of electronic devices 104A) and the second set of participants (associated with the second set of electronic devices 104B) to share media content during the online conference and to perform one or more annotations on the shared media content during the online conference. The plurality of electronic devices 104 may be further configured to transmit or receive the performed one or more annotations to/from the other electronic devices related to other participants of the online conference. The first set of electronic devices 104A and the second set of electronic devices 104B from the plurality of electronic devices 104 may be further configured to display the received one or more annotations. Examples of the plurality of electronic devices 104 may include, but are not limited to, a computing device, a desktop, a laptop, a smartphone, a cellular phone, a mobile phone, a computer workstation, and/or a CE device that may include a display and an application that may be configured to conduct or join online conferences.

The database 106 may include suitable logic, interfaces, and/or code that may be configured to store the profile information 116 pertaining to the plurality of participants 114. In some embodiments, the database 106 may be configured to store the media content shared during the online conference. The database 106 may be derived from data off a relational or non-relational database, or a set of comma-separated values (csv) files in conventional or big-data storage. The database 106 may be stored or cached on a device, such as a server 108 or the first electronic device 102. The device that stores the database 106 may be configured to receive a query for the profile information 116 pertaining to the plurality of participants 114 from the first electronic device 102. In response, the device of the database 106 may be configured to retrieve and provide the queried profile information 116 pertaining to the plurality of participants 114 to the first electronic device 102 based on the received query.

In some embodiments, the database 106 may be hosted on a plurality of servers stored at same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The server 108 may include suitable logic, circuitry, interfaces, and/or code that may be configured to receive details pertaining to an online conference (for example, a date and time associated with the online conference a number and identification of participants associated with the online conference, and so on). The server 108 may receive such details from the first electronic device 102 based on reception of a user-input indicative of an initiation of the online conference from the host 112 associated with the first electronic device 102. The server 108 may be further configured to transmit an online conference confirmation to the first electronic device 102 to indicate that the first electronic device 102 may initiate the online conference. The server 108 may be further configured to transmit the details of the online conference to the plurality of electronic devices 104. The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In an embodiment, the server 108 may be implemented as a plurality of distributed cloud-based resources by use of several technologies that may be well known to those ordinarily skilled in the art. A person with ordinary skill in the art will understand that the scope of the disclosure may not be limited to the implementation of the server 108 and the first electronic device 102 as two separate entities. In certain embodiments, the functionalities of the server 108 can be incorporated in its entirety or at least partially in the first electronic device 102, without a departure from the scope of the disclosure.

The communication network 110 may include a communication medium through which the first electronic device 102, the plurality of electronic devices 104, a device of the database 106, and the server 108 may communicate with each other. The communication network 110 may be a wired or wireless communication network. Examples of the communication network 110 may include, but are not limited to, the Internet, a cloud network, a Wireless Local Area Network (WLAN), a Wireless Fidelity (Wi-Fi) network, a Personal Area Network (PAN), a Local Area Network (LAN), a telephone line (POTS), and/or a Metropolitan Area Network (MAN), a mobile wireless network, such as a Long-Term Evolution (LTE) network (for example, 4th Generation or 5th Generation (5G) mobile network (i.e., 5G New Radio)). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols, or a combination thereof.

In operation, the first electronic device 102 may initiate an online conference based on a user input received from the host 112. The online conference may be initiated based on a selection of the plurality of participants 114 as participants associated with the online conference. The first electronic device 102 may transmit details related to the online conference to the server 108 or directly to the plurality of electronic devices 104 associated with the plurality of participants 114. Examples of the details related to the online conference may include, but are not limited to, a schedule of the online conference, an agenda of the online conference, and the plurality of participants 114 associated with the online conference. The first electronic device 102 may receive profile information 116 of each of the plurality of participants 114 from the database 106. Prior to the initiation of the online conference, the database 106 may receive the profile information 116 of each of the plurality of participants 114 from an electronic device of the corresponding participant. The database 106 may store the received profile information 116 of each of the plurality of participants 114. The profile information 116 may include, but is not limited to, information about an employment in an organization, information about a role or designation in an organization, social media profile information, experience information, skillset information, information about a number of followers on a social media, research paper publication information, information associated with membership in a social group, history information associated with content sharing permissions, or history information associated with content annotation permissions. Based on the initiation of the online conference, the first electronic device 102 may receive a confirmation associated with the online conference from the server 108. The first electronic device 102 may transmit an invite for the online conference to each of the plurality of participants 114 based on the reception of the confirmation from the server 108. The invite may include information (such as, dial-in numbers, meeting hyperlinks, a meeting number, and/or passkey) that may enable the plurality of participants 114 to join the online conference.

The first electronic device 102 may be further configured to grant a first set of participants, from the plurality of participants 114, a permission to annotate media content to be shared during the online conference. The first electronic device 102 may grant the permission (i.e., before the start of the online conference or exactly when the online conference starts) to each of the first set of participants based on the received profile information 116 pertaining to each of the first set of participants. For example, based on the received profile information 116, the first electronic device 102 may determine that the first participant 114A may be associated with an organization 'A' and may have a designation as of a 'manager'. In case, the host 112 of the online conference is also associated with the same organization (i.e., the organization 'A') and has the same designation (i.e., 'manager'), the first participant 114A may be selected as one of the first set of participants. Thereafter, the first electronic device 102 may grant, to the first participant 114A, the permission to annotate the media content to be shared during the online conference. The details related to the reception of the profile information 116 and the grant of the permission to annotate the shared media content are described, for example, in FIG. 3.

The first electronic device 102 may be further configured to receive one or more annotations (i.e., during the online conference) from a set of electronic devices associated with the first set of participants based on the granted permission. The one or more annotations may be related to the shared media content during the online conference. For example, the first electronic device 102 may receive the one or more annotations from the 1. The received one or more annotations may include, but are not limited to, a highlighting, a point, a line, a circle, an oval, a rectangle, an open shape, a closed shape, an image, a text, a URL, an arrow, or a tick mark.

The first electronic device 102 may be further configured to control a display of the received one or more annotations and the shared media content on each of a first display device associated with the first electronic device 102 and on a second display device associated with each of the plurality of electronic devices 104. For example, the first electronic device 102 may enable the received one or more annotations to be displayed on the first display device and the second display device associated with each of the plurality of electronic devices 104. In another example, the first electronic device 102 may disable the display of the received one or more annotations on the first display device and/or the second display device if a predefined time period has elapsed after the reception of the one or more annotations. The details related to the reception of the one or more annotations and the control of the display of the received one or more annotations are described, for example, in FIG. 6.

Figure 2:
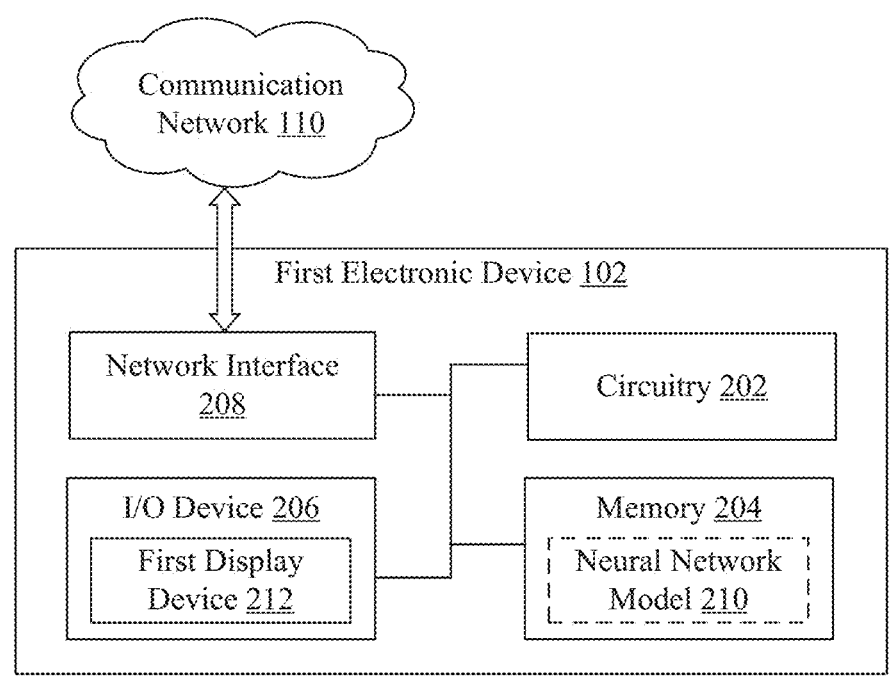
FIG. 2 is a block diagram that illustrates an exemplary first electronic device of FIG. 1 for control of permissions to annotate media content shared in an online conference, in accordance with an embodiment of the disclosure.

FIG. 2 is a block diagram that illustrates an exemplary first electronic device of FIG. 1 for control of permissions to annotate media content shared in an online conference, in accordance with an embodiment of the disclosure. FIG. 2 is explained in conjunction with elements from FIG. 1. With reference to FIG. 2, there is shown a block diagram 200 of the first electronic device 102. The first electronic device 102 may include circuitry 202, a memory 204, an input/output (I/O) device 206, and a network interface 208. In an embodiment, the memory 204 may also include a neural network model 210. In an embodiment, the I/O device 206 may also include a first display device 212. The circuitry 202 may be communicatively coupled to the memory 204, the I/O device 206, and the network interface 208. The circuitry 202 may be configured to communicate with the plurality of electronic devices 104, the device of the database 106, and the server 108 by use of the network interface 208.

The circuitry 202 may include suitable logic, circuitry, and interfaces that may be configured to execute program instructions associated with different operations to be executed by the first electronic device 102. The operations may include, for example, generation and storage of the neural network model 210 in the memory 204, reception of the profile information 116 pertaining to the plurality of participants 114 from the database 106, grant of the permission to the first set of participants to annotate the media content to be shared during the online conference, reception of the one or more annotations from the first set of participants, and control of display of the one or more annotations on the first display device 212 associated with the first electronic device 102 and on a second display device associated with each of the plurality of electronic devices 104. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The memory 204 may be configured to store the neural network model 210. In an embodiment, the memory 204 may store first profile information pertaining to the host 112 associated with the first electronic device 102, and the profile information 116 associated with each of the plurality of participants 114 who may be associated with the online conference hosted by the host 112. In an embodiment, the memory 204 may store the media content shared during the online conference. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The neural network model 210 may include a computational network or a system of artificial neurons, arranged in a plurality of layers, as nodes. The plurality of layers of the neural network model 210 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model 210. Outputs of each hidden layer may be coupled to inputs of at least one node in other layers of the neural network model 210. Node(s) in the final layer may receive inputs from at least one hidden layer to output a result. The number of layers and the number of nodes in each layer may be determined from hyper-parameters of the neural network model 210. Such hyper-parameters may be set before training, while training, or after training the neural network model 210 on a training dataset.

Each node of the neural network model 210 may correspond to a mathematical function (e.g., a sigmoid function or a rectified linear unit) with a set of parameters, tunable during training of the neural network model 210. The set of parameters may include, for example, a weight parameter, a regularization parameter, and the like. Each node may use the mathematical function to compute an output based on one or more inputs from nodes in other layer(s) (e.g., previous layer(s)) of the neural network model 210. All or some of the nodes of the neural network model 210 may correspond to same or a different mathematical function. In training of the neural network model 210, one or more parameters of each node of the neural network model 210 may be updated based on whether an output of the final layer for a given input (from the training dataset) matches a correct result based on a loss function for the neural network model 210. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

The neural network model 210 may include electronic data, which may be implemented as, for example, a software component of an application executable on an electronic device (for example, the first electronic device 102). The neural network model 210 may rely on libraries, external scripts, or other logic/instructions for execution by a processing device, such as the circuitry 202. The neural network model 210 may include code and routines configured to enable a computing device, such as the circuitry 202 to perform one or more operations to select a set of participants from the plurality of participants 114 based on topic information associated with the media content and the profile information 116 associated with each of the plurality of participants 114. Additionally, or alternatively, the neural network model 210 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model may be implemented using a combination of hardware and software. In an embodiment, the neural network model 210 may be implemented as a deep learning model. In certain embodiments, the neural network model 210 may be based on a hybrid architecture of multiple Deep Neural Networks (DNNs). Examples of the neural network model 210 may include, but are not limited to, a neural network model or a model based on one or more of regression method(s), instance-based method(s), regularization method(s), decision tree method(s), Bayesian method(s), clustering method(s), association rule learning, and dimensionality reduction method(s). Examples of the neural network model 210 may include, but are not limited to, an artificial neural network (ANN), a deep neural network (DNN), a convolutional neural network (CNN), a recurrent neural network (RNN), a CNN-recurrent neural network (CNN-RNN), R-CNN, Fast R-CNN, Faster R-CNN, a Residual Neural Network (Res-Net), a Feature Pyramid Network (FPN), and/or a combination thereof.

The I/O device 206 may include suitable logic, circuitry, interfaces, and/or code that may be configured to receive an input and provide an output based on the received input. For example, the I/O device 206 may receive user inputs from the host 112 that may be indicative to initiate the online conference or indicative of a confirmation to grant permissions to annotate on the shared media content, or revoke permissions to annotate the shared media content. Examples of the I/O device 206 may include, but are not limited to, a touch screen, a keyboard, a mouse, a joystick, a microphone, the first display device 212, and a speaker.

The I/O device 206 may include the first display device 212. The first display device 212 may include suitable logic, circuitry, and interfaces that may be configured to receive inputs from the circuitry 202 to display, on a display screen, information about the online conference. The first display device 212 may further display, but is not limited to, one or more annotations received from the first set of participants, profile information 116 pertaining to the plurality of participants 114, recommendations to grant permissions to annotate the shared media content, recommendations to revoke permissions to annotate the shared media content, recommendations to discontinue a display of the one or more annotations for certain participants, and a timeline of the received one or more annotations for each of the first set of participants. The display screen may be a touch screen which may enable a user to provide a user-input via the first display device 212 or the display screen. The touch screen may be at least one of a resistive touch screen, a capacitive touch screen, or a thermal touch screen. The first display device 212 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202, the plurality of electronic devices 104, the device of the database 106, and the server 108, via the communication network 110. The network interface 208 may be implemented by use of various known technologies to support wired or wireless communication of the first electronic device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5$^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol. The functions or operations executed by the first electronic device 102, as described in FIG. 1, may be performed by the circuitry 202. Operations executed by the circuitry 202 are described in detail, for example, in FIGS. 3, 4, 5, and 6.

Figure 3:
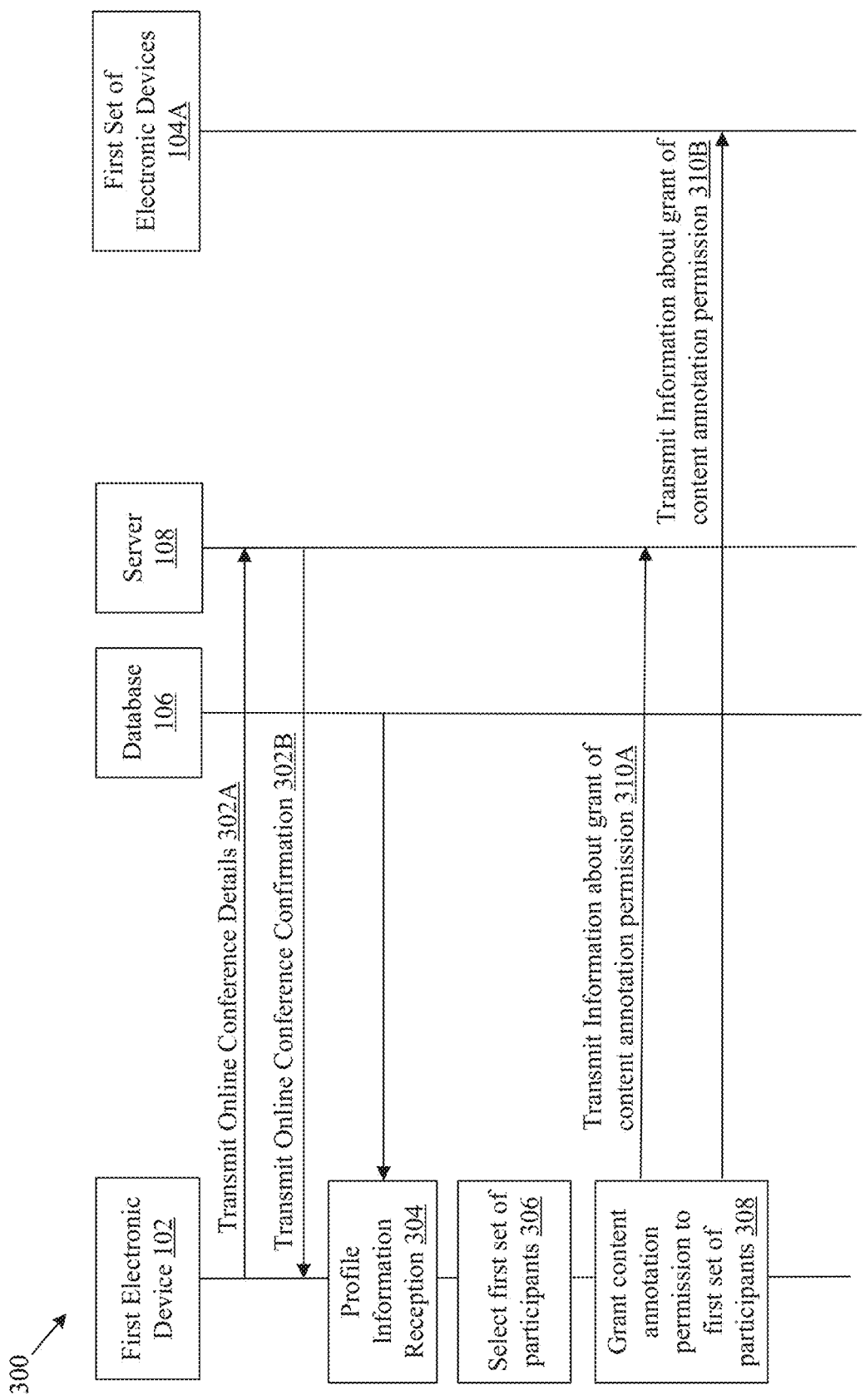
FIG. 3 is a diagram that illustrates exemplary operations to grant a permission to a first set of participants to annotate media content shared in an online conference hosted by the first electronic device of FIG. 2, in accordance with an embodiment of the disclosure.

FIG. 3 is a diagram that illustrates exemplary operations to grant a permission to a first set of participants to annotate media content shared in an online conference hosted by the first electronic device of FIG. 2, in accordance with an embodiment of the disclosure. FIG. 3 is explained in conjunction with elements from FIG. 1 and FIG. 2. With reference to FIG. 3, there is shown a timeline 300 that illustrates exemplary operations 302A, 302B, 304, 306, 308, 310A, and 310B. The exemplary operations may be executed to grant a permission to each of the first set of participants to annotate the media content to be shared in the online conference which has to be hosted by the first electronic device 102. The exemplary operations may be executed by one or more components of FIG. 1, such as, the first electronic device 102, the database 106, the server 108, and the first set of electronic devices 104A. In an embodiment, the operations 302A to 310B may be executed prior to a start of the online conference. Alternatively, the operations 302A to 310B may be executed at the initiation of the online conference.

At 302A, details related to an online conference may be transmitted. The circuitry 202 of the first electronic device 102 may be configured to transmit the details related to the online conference to the server 108. The server 108 may receive the transmitted details related to the online conference from the first electronic device 102. The details related to the online conference may be transmitted based on reception of a user input from the host 112 associated with the first electronic device 102. The received user input may be indicative of an instruction to initiate the online conference. The details related to the online conference transmitted to the server 108 may include, but are not limited to, a conference schedule, a list of participants (e.g., the plurality of participants 114) associated with the online conference, agenda of the online conference, media content that may be further shared during the online conference, and the profile information pertaining to the host 112 and/or the plurality of participants 114 associated with the online conference.

At 302B, a confirmation associated with the online conference may be transmitted. The server 108 may be configured to transmit the confirmation associated with the online conference to the first electronic device 102, in response to the details related to the online conference received from the first electronic device 102. The confirmation associated with the online conference may indicate that the first electronic device 102 and the host 112 may be allowed to initiate the online conference, for example, with the plurality of participants 114. The circuitry 202 of the first electronic device 102 may be configured to receive the confirmation associated with the online conference from the server 108.

At 304, profile information (e.g., the profile information 116) pertaining to each of the plurality of participants 114 (i.e., associated with the online conference) may be received. The circuitry 202 of the first electronic device 102 may be configured to receive the profile information 116 associated with each of the plurality of participants 114 who may be associated with the online conference to be hosted by the host 112 associated with the first electronic device 102. The first electronic device 102 may be owned by the host 112 or may be a used by the host 112 to initiate and join the online conference with each of the plurality of participants 114. In an embodiment, the received profile information 116 may not include profile information pertaining to the host 112. The host 112 may not be included in the plurality of participants 114 or may not join the online conference. The profile information 116 may be received from the database 106 based on a request transmitted from the first electronic device 102. Examples of the received profile information 116 of a participant of the plurality of participants 114 may include, but are not limited to, information about an employment of the participant in an organization, information about a role or designation of the participant in the organization, social media profile information of the participant, experience information of the participant, skillset information of the participant, information about a number of followers of the participant on a social media, research paper publication information of the participant, information associated with membership of the participant in a social group, history information of the participant associated with content sharing permissions, or history information associated with content annotation permissions.

At 306, a first set of participants may be selected from the plurality of participants 114 associated with the online conference. The circuitry 202 of the first electronic device 102 may be configured to select the first set of participants from the plurality of participants 114 before the initiation of the online conference. In an embodiment, the circuitry 202 of the first electronic device 102 may be configured to determine a first expertise score associated with the host 112 based on first profile information associated with the host 112. The first profile information may be stored in the memory 204 of the first electronic device 102. The first profile information may indicate, but is not limited to, information about an employment of the host 112 in an organization, information about a role or designation of the host 112 in the organization, social media profile information of the host 112, experience information of the host 112, skillset information of the host 112, information about a number of followers of the host 112 on a social media, research paper publication information of the host 112, and information associated with membership of the host 112 in a social group. Each information component (for example, social media profile information of the host 112) of the first profile information may be associated with a value (for example a number between "0" and "1"). Further, each information component of the first profile information may be associated with a weight (between "0" and "1") such that a sum of weights assigned to the entire set of information components in the first profile information may be equal to "1". In an embodiment, the circuitry 202 of the first electronic device 102 may determine the first expertise score associated with the host 112 based on a weighted summation of values associated with respective information components of the first profile information. For example, the weight associated with each information component may be multiplied with the value associated with the respective information component. Thereafter, the weighted values of each information component may be summed to determine the first expertise score associated with the host 112. In an embodiment, the values associated with the information components of the profile information may be updated. For example, a value associated with the information component 'skillset information' of the host 112 may be updated based on an acquisition of new skills by the host 112. In such case, the circuitry 202 of the first electronic device 102 may determine the first expertise score associated with the host 112 each time one or more values of the information components of the first profile information may be updated. In an embodiment, the first expertise score associated with the host 112 may be pre-determined prior to the execution of the operation 302A.

The circuitry 202 of the electronic device 302 may be further configured to determine a second expertise score associated with each of the plurality of participants 114 based on the received profile information 116 associated with each of the plurality of participants 114. Each information component of the profile information 116 of a participant (e.g., a first participant 114A) of the plurality of participants 114 may be assigned a value (for example, a number between "0" to "1") and a weightage (for example, a number between "0" to "1"). In an embodiment, the circuitry 202 of the first electronic device 102 may determine a second expertise score associated with the first participant 114A based on a weighted summation of values associated with respective information components of the profile information 116 pertaining to the first participant 114A. The circuitry 202 may determine the second expertise score associated with each of the plurality of participants 114, each time one or more values of information components of the profile information 116 (i.e., pertaining to each of the plurality of participants 114) are updated. In an embodiment, the second expertise score associated with each of the participants 114 may be pre-determined prior to the execution of the operation 302A.

The circuitry 202 may be further configured to compare the determined first expertise score associated with the host 112 with the determined second expertise score associated with each of the plurality of participants 114. For example, in case, the host 112 and the first participant 114A belong to the same organization, a difference between a value of the information component about an employment in an organization' in the first profile information of the host 112 and about the profile information 116 of the first participant 114A may be zero. This may reduce an overall difference between the first expertise score associated with the host 112 and the second expertise score associated with the first participant 114A. Similarly, if the role or the designation of the host 112 and the first participant 114A is same in an organization, then the difference between the first expertise score associated with the host 112 and the second expertise score associated with the first participant 114A may be zero or significantly less, in comparison to other participants with lesser experience/designation than the host 112 of the online conference. In another example, in a scenario, the host 112 may have an experience of 5 years in a field (i.e., experience information), while the first participant 114A and the second participant 114B may have an experience of 2 years and 3 years, respectively in the same field. In such scenario, a difference between values of the 'experience information' for the second participant 114B and the host 112 may be lesser than a difference between values of the 'experience information' for the first participant 114A and the host 112. Herein, a difference between the first expertise score and the second expertise score associated with the first participant 114A may be higher than a difference between the first expertise score and the second expertise score associated with the second participant 114B. In such case, in an example, the second participant 114B may be selected as one of the first set of participants, while the first participant 114A may not be selected, as the total experience of the host 112 and the second participant 114B may be same or closer, as compared to the first participant 114A.

The circuitry 202 may be further configured to select the first set of participants from the plurality of participants 114, based on the comparison. For example, the circuitry 202 of the first electronic device 102 may be configured to select the second participant 114B as one of the first set of participants, in case the difference between the first expertise score associated with the host 112 and the second expertise score of the second participant 114B is less than a predefined threshold difference. In another embodiment, the circuitry 202 may be configured to select a pre-defined number of participants from the plurality of participants 114 based on the comparison of the first expertise score associated with the host 112 with the second expertise score associated with each of the plurality of participants 114. For example, the circuitry 202 may select top "N" participants from the plurality of participants 114 based on the comparison of the first expertise score associated with the host 112 with the second expertise score associated with each of the plurality of participants 114. To determine the top "N" participants, the circuitry 202 may sort the plurality of participants 114 based on a descending order of a difference between the first expertise score and the second expertise score of the respective participant. Thereafter, the circuitry 202 may select the top "N" participants as the first set of participants from the sorted plurality of participants 114. In an embodiment, the circuitry 202 may receive the value of "N" (i.e., the number of participants to be selected as the first set of participants) as a user input from the host 112.

In another embodiment, the circuitry 202 may be configured to receive topic information associated with the media content to be shared during the online conference. For example, in case the media content is a presentation that includes multiple slides, the topic information may be determined based on at least one of: a title of the presentation, a summary of contents of the presentation, headings of each slide of the presentation, an agenda of the online conference, and so on. In another example, in case the media content is video content, the circuitry 202 may determine a title text and/or a closed caption text associated with the video content and determine the topic information associated with the media content based on the determined title text and/or closed caption text. In yet another example, in case the media content is audio content, the circuitry 202 may convert at least a portion of the audio content into corresponding textual content based on an audio-to-text conversion technique. The circuitry 202 may further determine the topic information associated with the media content based on the textual content corresponding to the portion of the audio content. In some embodiment, the circuitry 202 may receive the topic information of the media content to be shared in the online conference, from the database 106 or from the server 108.

The circuitry 202 may be configured to apply the neural network model 210 on the received/determined topic information and on the received profile information 116 associated with each of the plurality of participants 114. In an embodiment, the neural network model 210 may be trained to classify each of the plurality of participants 114 based on a familiarity or expertise of each of the plurality of participants 114 with respect to the topic information. During a training stage of the neural network model 210, the neural network model 210 may be provided with inputs from a training dataset comprising different topic information and profile information pertaining to selected participants. The profile information in the training dataset may pertain to the host 112 and to one or more participants of the plurality of participants 114. The familiarity or expertise of the host 112 and of one or more participants with respect to the topic information may be known during the training stage. In an embodiment, the neural network model 210 may be trained to quantize the familiarity of the participants selected in the training dataset with respect to the topic information based on the profile information associated with the corresponding participants. The familiarity or the expertise may be quantized at different predefined levels within a range. The familiarity or the expertise of a participant may correspond to the experience information and/or the skillset information of the participant. For example, the topic information associated with the media content may pertain to inflation in economics. Herein, the first participant 114A of the selected participants may be associated with a financial institution and the second participant 114B of the plurality of participants 114 may be associated with a construction firm. In such case, the neural network model 210 may classify the first participant 114A with respect to the topic information to a higher quantization level of familiarity and classify the second participant with respect to the topic information to a lower quantization level of familiarity. The first participant 114A may be classified to the higher quantization level than the second participant 114B, as the first participant 114A may have more expertise and domain knowledge with respect to "inflation in economics" (i.e., the topic information) than the second participant 114B.

The circuitry 202 may be further configured to select the first set of participants from the plurality of participants 114 based on the application of the neural network model 210 on the received topic information and on the received profile information 116. The circuitry 202 may select a certain familiarity level as a first threshold familiarity level. The circuitry 202 may select a participant of the plurality of participants 114 as one of the first set of participants, in case the familiarity level of the particular participant with respect to the topic information is greater than the first threshold familiarity level. For example, in case, the first participant 114A has published or presented three research papers (i.e., research paper publication information) or taken trainings related to the topic information, the neural network model 210 may quantize or define the familiarity level of the first participant 114A with the topic information at a level higher than the first threshold familiarity level. In such case, the circuitry 202 may select the first participant 114A as one of the first set of participants. In another example, in case, the second participant 114B has published no research paper or not taken any trainings related to the topic information, or the topic information is not one of the specializations or domain of work of the second participant 114B, the familiarity level of the second participant 114B may be lower than the first threshold familiarity level. In such case, the circuitry 202 may not select the second participant 114B as one of the first set of participants. In another embodiment, if a number of social media followers (i.e., with expertise similar to the topic information) of a particular participant is higher than a specific follower threshold, then the participant may be selected as one of the first set of participants. For example, if the topic information corresponds to an artificial intelligence domain and the first participant 114A has higher number of social media followers who have expertise (or qualification, certification, experience, social media profile information, or membership in a social group/community) in the same domain of the artificial intelligence, then the first participant 114A may also be considered as an expert in the same domain and may be selected as one of the first set of participants to further get permission to annotate the media content to be shared in the online conference.

In an embodiment, if the history information associated with content sharing permissions for a participant indicates that the participant was granted content sharing permissions in past in more than a threshold percent or a number of online conferences associated with similar topic or domain attended by the participant, then the participant may be selected as one of the first set of participants. For example, the topic information corresponds to artificial intelligence domain and the first participant 114A has shared content in at least 70% of the online conferences of the artificial intelligence domain attended by the first participant 114A in recent past. In such case, the first participant 114A may be considered as an expert of the same domain (i.e., artificial intelligence) and may be selected as one of the first set of participants to further get permission to annotate the media content to be shared in the online conference.

In an embodiment, if the history information associated with content annotation permissions for a participant indicates that the participant was granted content annotation permissions in past in more than a threshold percent or a number of online conferences associated with similar topic or domain attended by the participant, then the participant may be selected as one of the first set of participants. For example, the topic information corresponds to the artificial intelligence domain and the first participant 114A has annotated at least 70% of the media content shared during the online conferences of the artificial intelligence domain attended by the first participant 114A in recent past. In such case, the first participant 114A may be considered as an expert of the same domain (i.e., artificial intelligence) and may be selected as one of the first set of participants to further get permission to annotate the media content to be shared in the online conference.

At 308, a permission to annotate the media content, to be shared during the online conference, may be granted to the first set of participants. The circuitry 202 may grant the permission to the selected first set of participants to annotate the media content to be shared during the online conference. In an embodiment, the circuitry 202 may be configured to control the first display device 212, associated with the first electronic device 102, to display a recommendation for the host 112 to grant the permission to the selected first set of participants. For example, the circuitry 202 may display, on the first display device 212, a list of entries where each entry may include names and contact details of the plurality of participants 114. Herein, the recommendation may be indicated by, for example, a selection mark (not shown) associated with each of the selected first set of participants of the plurality of participants 114.

The circuitry 202 may be further configured to receive a first user input (i.e., received from the host 112) indicative of a confirmation to grant the permission to the selected first set of participants, based on the displayed recommendation. For example, each entry in the displayed list of the plurality of participants 114 may include two radio-buttons, such as, a "Yes' radio-button and a "No' radio-button. The circuitry 202 may receive the first user input from the host 112 based on a selection of one of the two radio-buttons for each of the participants. As described in the aforementioned, the circuitry 202 may control the display of the recommendation of the selected first set of participants based on an indication of a selection mark associated with the entry corresponding to each of the first set of participants of the plurality of participants 114. The circuitry 202 may receive the first user input indicative of the confirmation to grant the permission by the host 112, based on the displayed recommendation for the first set of participants. As an example, the circuitry 202 may receive a selection of the 'Yes' radio-button corresponding to each of the first set of participants as the confirmation from the host 112 to grant the permission to each of the first set of participants. Based on the received first user input, the circuitry 202 of the first electronic device 102 may be further configured to, grant, to the first set of participants, the permission to annotate the media content to be shared during the online conference (i.e., to be started with all the plurality of participants 114). For example, the circuitry 202 may grant the permission to a participant (i.e., selected as one of the first set of participants) to annotate the media content, in case the host 112 selects the 'Yes' radio-button corresponding to the entry associated with the participant. In some embodiments, the circuitry 202 may control the first display device 212 to display the recommendation indicating the automatically selected first set of participants (as described at 306), and the first user input (i.e. received from the host 112 using a UI element like a button) may indicate a single confirmation provided to the complete list of the selected first set of participants to annotate the media content, rather than confirmation given to each participant one by one.

In another embodiment, the circuitry 202 may be configured to control the first display device 212 to display the received profile information 116 associated with each of the plurality of participants 114. Thus, the circuitry 202 of the disclosed first electronic device 102 may enable the host 112 to view the received profile information 116 associated with each of the plurality of participants 114 associated with the online conference. For example, the circuitry 202 may display, on the first display device 212, a list comprising entries of the profile information 116 of each of the plurality of participants 114. The circuitry 202 of the first electronic device 102 may be further configured to receive a third user input indicative of a selection (or indicative of a confirmation for the automatic selection) of the first set of participants from the plurality of participants 114, based on the displayed profile information 116 associated with each of the plurality of participants 114 or associated with each of the selected first set of participants. As an example, the circuitry 202 may receive a selection of a 'Yes' button (not shown) corresponding to the first set of participants as the selection of each of the first set of participants from the plurality of participants 114. The circuitry 202 may be further configured to, grant, to the first set of participants, the permission to annotate the media content, based on the received third user input.

At 310A, information about the grant of the permission to annotate the media content may be transmitted to the server 108. The circuitry 202 may be configured to transmit the information about the grant of the permissions (i.e., provided to the first set of participants to annotate the media content, to be shared during the online conference) to the server 108. The server 108 may receive such information transmitted by the first electronic device 102 and may administer the online conference based on the received information.

At 310B, the information about the grant of the permission to annotate the media content may be transmitted to the first set of electronic devices 104A. The first circuitry 202 may be further configured to transmit the information about the grant of the permissions (i.e., provided to the first set of participants to annotate the media content, to be shared during the online conference) to the first set of electronic devices 104A. The first set of participants may be associated with the first set of electronic devices 104A. The first set of electronic devices 104A may receive such information transmitted by the first electronic device 102. The reception of the information by each of the first set of electronic devices 104A may indicate that each of the selected first set of participants may be granted with the permission to annotate the media content to be shared during the online conference (i.e., to be stated as per a predefined schedule of the online conference with all the plurality of participants 114).

Figure 4:
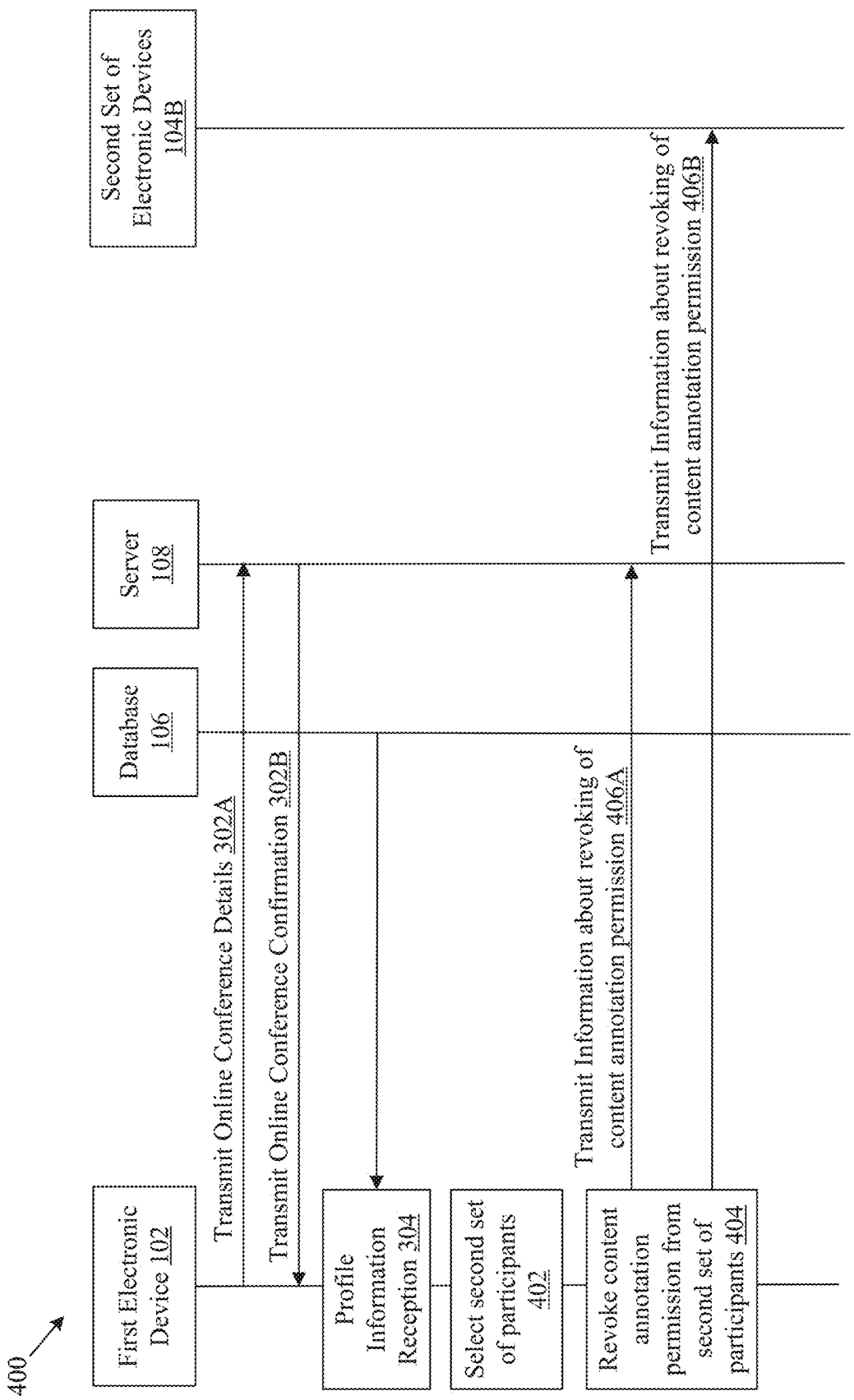
FIG. 4 is a diagram that illustrates exemplary operations to revoke permissions from a second set of participants to annotate media content shared in an online conference hosted by the first electronic device of FIG. 2, in accordance with an embodiment of the disclosure.

FIG. 4 is a diagram that illustrates exemplary operations to revoke permissions from a second set of participants to annotate media content shared in an online conference hosted by the first electronic device of FIG. 2, in accordance with an embodiment of the disclosure. FIG. 4 is explained in conjunction with elements from FIG. 1, FIG. 2, and FIG. 3. With reference to FIG. 4, there is shown a timeline 400 that illustrates exemplary operations 302A, 302B, 304, 402, 404, 406A, and 406B. The exemplary operations may be executed to revoke a permission from each of a second set of participants to annotate the media content to be shared in the online conference hosted by the first electronic device 102. The exemplary operations may be executed by one or more components of FIG. 1, such as the first electronic device 102, the database 106, the server 108, and the second set of electronic devices 104B. The operations 302A to 406B may be executed prior to the start of the online conference. Alternatively, the operations 302A to 406B may be executed at the initiation of the online conference. For the sake of brevity, description of the steps 302A, 302B, and 304 is omitted herein. The details pertaining to the steps 302A, 302B, and 304, are provided, for example, in FIG. 3.

At 402, a second set of participants of the plurality of participants 114 associated with the online conference may be selected. The circuitry 202 of the first electronic device 102 may be configured to select the second set of participants of the plurality of participants 114 associated with the online conference. In an embodiment, the second set of participants may be selected based on the received topic information of the online conference and the received profile information 116 associated with each of the plurality of participants 114. In another embodiment, the second set of participants may be selected from the plurality of participants 114 based on the application of the neural network model 210 on the received topic information and on the received profile information 116 associated with each of the plurality of participants 114. Herein, the first set of participants (i.e., selected to annotate the media content) may include the second set of participants. In an embodiment, the second set of participants may include one or more participants who may be observers associated with the online conference. As discussed in FIG. 3, the circuitry 202 may be configured to receive the topic information associated with the media content. The circuitry 202 may be configured to apply the neural network model 210 on the received topic information and on the received profile information 116 associated with each of the plurality of participants 114. The neural network model 210 may be trained to classify each of the plurality of participants 114 based on a familiarity level of each of the plurality of participants 114 with the topic information. For example, the circuitry 202 may select a participant of the plurality of participants 114 as one of the second set of participants, in case the familiarity level of the participant with the topic information is lesser than a second threshold familiarity level. In an embodiment, a participant may be selected as one of the first set of participants, in case the familiarity level of the participant with the topic information is determined to be greater than the first threshold familiarity level, as described, for example, in FIG. 3 (at 306). In an embodiment, the second threshold familiarity level may be lesser than the first threshold familiarity level. The familiarity level of a participant below the second threshold familiarity level may indicate that the participant may not be an expert in the domain associated with the topic information and thus the participant may not be provided content annotation rights.

In another embodiment, the circuitry 202 may be configured to determine the first expertise score associated with the host 112 based on the first profile information associated with the host 112. Further, the circuitry 202 may be configured to determine the second expertise score associated with each of the plurality of participants 114 based on the profile information 116 associated with each of the plurality of participants 114. The determination of the first expertise score and the determination of the second expertise score are described, for example, in FIG. 3 (at 306). The circuitry 202 may compare the determined first expertise score with the determined second expertise score associated with each of the plurality of participants 114. Based on the comparison, the circuitry 202 may select the second set of participants from the plurality of participants 114. For example, the circuitry 202 may determine a difference between the first expertise score and the second expertise score associated with each of the plurality of participants 114. In case, the difference for a certain participant is greater than a threshold difference, the participant may be selected as one of the second set of participants. The higher difference may indicate that the second set of participants may not be an expert or a knowledgeable person for a particular topic indicated by the topic information of the online conference. In other words, each of the second set of participants may not be an appropriate participant to annotate the media content and may be an observer during the online conference. Therefore, the second set of participants may not be given the permission to annotate the media content or an already assigned permission may be revoked for the second set of participants based on a change in the topic information of recent upcoming online conference. For example, the first set of participants (i.e., including the second set of participants) may be granted with annotation rights based on topic information of last online conference, however, based on a change in the topic (or sub-topic), for certain participants (like the second set of participants) the permission to annotate the media content (i.e., to be shared during the upcoming online conference) may be revoked.

In another embodiment, the circuitry 202 may be configured to determine a number of participants in the first set of participants. The circuitry 202 may sort the first set of participants in a descending order of at least one of the familiarity level or the second expertise score of each participant of the first set of participants. The circuitry 202 may determine a predefined threshold associated with a number of participants who may be allowed to annotate the media content shared in the online conference. In an embodiment, the circuitry 202 may receive the predefined threshold as a user input from the host 112. Based on the predefined threshold, the circuitry 202 may select a bottom "M" number of participants from the sorted first set of participants, as the second set of participants from the first set of participants. For example, in case the predefined threshold is "10" and the number of participants in the first set of participants is "14", the circuitry 202 may select the bottom "4" participants from the sorted first set of participants as the second set of participants to revoke the permission to annotate the media content to be shared in the online conference which has to be started or just started.

At 404, permission to annotate the media content, to be shared during the online conference, may be revoked from the second set of participants. The circuitry 202 of the first electronic device 102 may be configured to revoke, from the second set of participants, the permission to annotate the media content to be shared during the online conference. The circuitry 202 may revoke the permission from the second set of participants before the start of the online conference. In an embodiment, the circuitry 202 may be configured to control the first display device 212 to display a recommendation to revoke the permission from the selected second set of participants. In an embodiment, the second set of participants may be selected from the first set of participants based on the application of the neural network model 210 on the topic information and on each of the profile information 116 of each of the plurality of participants 114. The selection of the second set of participants is described, for example, at 402. The circuitry 202 may receive a second user input, from the host 112, indicative of a confirmation to revoke the permission from the selected second set of participants, based on the displayed recommendation.

For example, the circuitry 202 may display, on the first display device 212, a list that may include entries of the first set of participants. Herein, the recommendation may be indicated based on a selection mark (not shown) associated with each of the second set of participants of the first set of participants. Each entry in the displayed list of the first set of participants may include two radio-buttons, such as, a "Yes' radio-button and a "No' radio-button. The circuitry 202 may receive the second user input from the host 112 based on a selection of one of the two radio-buttons for each of the second set of participants. The circuitry 202 may receive the second user input indicative of the confirmation by the host 112 to revoke the permission from the second set of participants. The host 112 may provide the second user input based on the displayed recommendations indicating the second set of participants to revoke the annotation rights. In some embodiments, the circuitry 202 may control the first display device 212 to display the recommendation indicating the automatically selected second set of participants (as described at 402), and the second user input (i.e., received from the host 112) may indicate a single confirmation provided to the complete list of the selected second set of participants to revoke rights for the annotations of the media content, rather than confirmation given to each participant one by one.

In another embodiment, the circuitry 202 may be configured to control the first display device 212 to display the received profile information 116 associated with each of the plurality of participants 114. Thus, the circuitry 202 of the disclosed first electronic device 102 may enable the host 112 to view the received profile information 116 associated with each of the plurality of participants 114 associated with the online conference to be hosted by the host 112. For example, the circuitry 202 may display, on the first display device 212, a list comprising entries of the profile information 116 of each of the plurality of participants 114. The circuitry 202 may be further configured to receive a fourth user input indicative of a selection of the second set of participants from the plurality of participants 114, based on the displayed profile information 116 associated with each of the plurality of participants 114 as described, for example, at 308 in FIG. 3. For example, each entry in the displayed list of the plurality of participants 114 may include two radio-buttons, such as, a 'Yes' radio-button and a 'No' radio-button. The circuitry 202 may receive the fourth user input from the host 112 based on a selection of one of the two radio-buttons. The circuitry 202 may receive the fourth user input indicative of a selection of the second set of participants of the plurality of participants 114, based on the displayed profile information 116 associated with each of the plurality of participants 114. As an example, the circuitry 202 may receive a selection of the 'Yes' radio-button corresponding to certain participants for the selection of each of the second set of participants from the plurality of participants 114. The circuitry 202 may be further configured to, revoke, from the second set of participants, the permission to annotate the media content, based on the received fourth user input.

At 406A, information about the revoke of the permission to annotate the media content may be transmitted to the server 108. The circuitry 202 may be configured to transmit information indicative of the revoke of the permission (i.e., to annotate the media content to be shared during the online conference) for the second set of participants to the server 108. The server 108 may receive the transmitted information from the first electronic device 102 and may administer the online conference based on the received information about the updated annotation permission for the second set of participants out of the plurality of participants 114.

At 406B, the information about the revoke of the permission to annotate the media content may be transmitted to the second set of electronic devices 104B. The circuitry 202 may transmit the information indicative of the revoke of the permission to annotate the media content (i.e., to be shared during the online conference) to each of the second set of electronic devices 104B. The second set of participants may be associated with the second set of electronic devices 104B. Each of the second set of electronic devices 104B may receive the transmitted information from the first electronic device 102. The receipt of the transmitted information by the second set of electronic devices 104B may indicate that the second set of participants may be denied permission to annotate the media content to be shared during the online conference.

Figure 5:
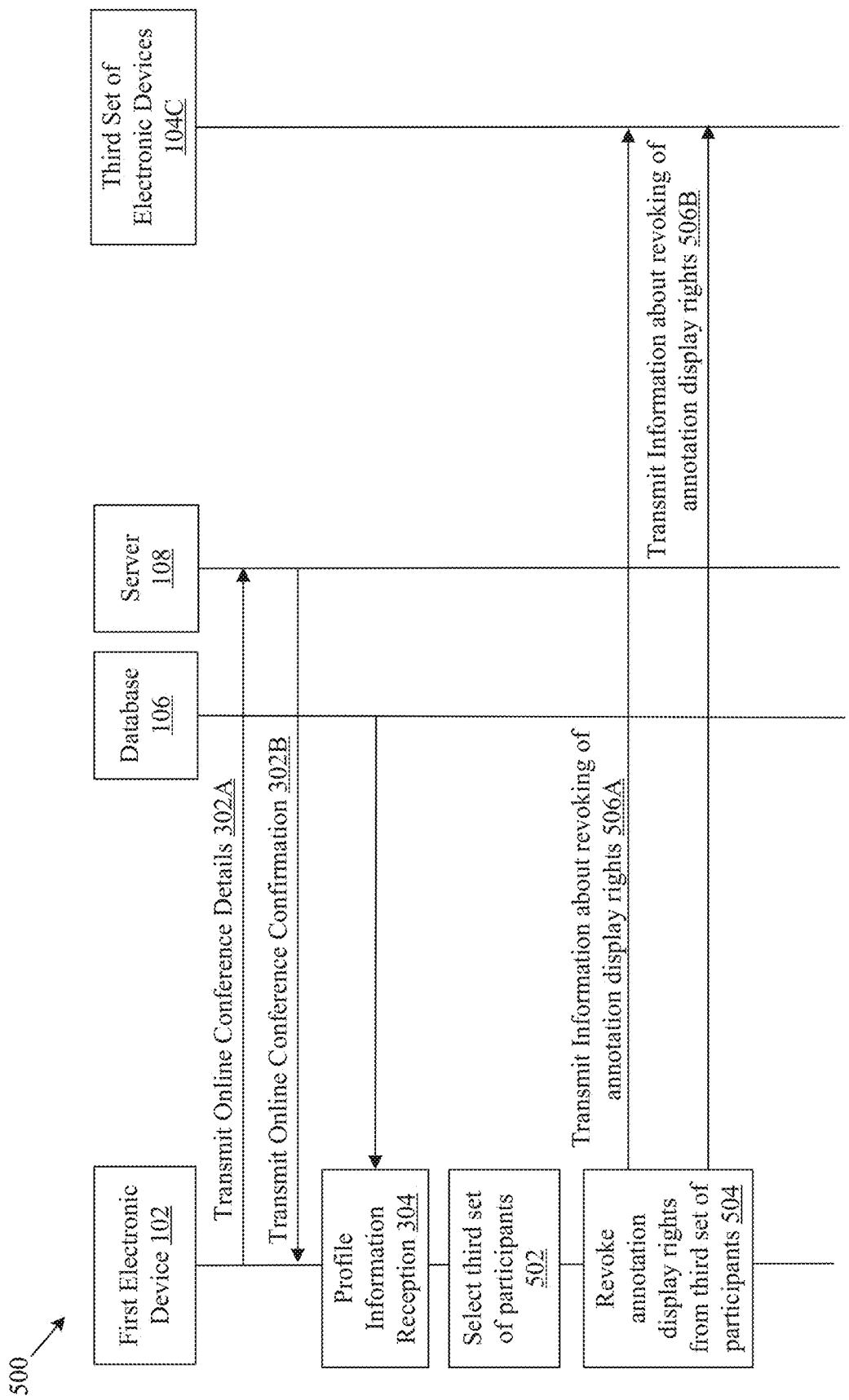
FIG. 5 is a diagram that illustrates exemplary operations to revoke display rights from a third set of participants for annotations associated with media content shared in an online conference hosted by the first electronic device of FIG. 2, in accordance with an embodiment of the disclosure.

FIG. 5 is a diagram that illustrates exemplary operations to revoke display rights from a third set of participants for annotations associated with media content shared in an online conference hosted by the first electronic device of FIG. 2, in accordance with an embodiment of the disclosure. FIG. 5 is explained in conjunction with elements from FIG. 1, FIG. 2, FIG. 3, and FIG. 4. With reference to FIG. 5, there is shown a timeline 500 that illustrates exemplary operations 302A, 302B, 304, 502, 504, 506A, and 506B. The exemplary operations may be executed to revoke display rights from a third set of participants for annotations to be shared in an online conference. The exemplary operations may be executed by one or more components of FIG. 1, such as the first electronic device 102, the database 106, the server 108, and the third set of electronic devices 104C. The operations 302A to 506B may be executed prior to the start of the online conference. Alternatively, the operations 302A to 506B may be executed at the initiation of the online conference. For the sake of brevity, description of the steps 302A, 302B, and 304 is omitted herein. The details pertaining to the steps 302A, 302B, and 304, are provided, for example, in FIG. 3.

At 502, a third set of participants may be selected from the plurality of participants 114 associated with the online conference. The circuitry 202 of the first electronic device 102 may be configured to select the third set of participants from the plurality of participants 114 associated with the online conference. In an embodiment, the third set of participants may be selected from the plurality of participants 114, based on the received profile information 116 associated with each of the plurality of participants 114. In another embodiment, the third set of participants may be selected from the plurality of participants 114 based on the application of the neural network model 210 on the received profile information 116 associated with each of the plurality of participants 114. In an embodiment, the first set of participants may include the third set of participants. In an embodiment, the third set of participants may include one or more participants who may be guest participants (e.g., participants who may not belong to an organization associated with the host 112) associated with the online conference. For example, in case a participant has a high familiarity level or a high second expertise score based on a match between the expertise of the participant and the topic information; and the same participant is an outside or guest to the organization of the host 112. Such participant may be selected as the first set of participants (to get permission to annotate the media content) but may also be selected as the third set of participants for whom the display rights to view the annotations during the online conference may not be permitted or revoked. Thus, such participants in the third set of participants may not be able to view the annotations made by other participants (i.e., with same organization as of the host 112) of the first set of participants. Based on the control of the display rights of the annotations for the third set of participants (i.e., guests), the disclosed first electronic device 102 may ensure confidentiality of annotations made by the participants of the same organization. As discussed in FIG. 3, the circuitry 202 may be configured to receive the profile information 116 associated with each of the plurality of participants 114. The circuitry 202 may be further configured to apply the neural network model 210 on the received profile information 116 associated with each of the plurality of participants 114. The circuitry 202 may determine (using the neural network model 210) whether the participant belong to the organization similar to the organization of the host 112, based on the profile information 116 of each of the plurality of participants 114.

At 504, annotation display rights associated with the media content to be shared in the online conference may be revoked from the third set of participants. The circuitry 202 may be configured to revoke annotation display rights associated with the media content to be shared in the online conference from the third set of participants. Thus, during the online conference, the circuitry 202 may mask the display of the one or more annotations (i.e., associated with the media content shared during the online conference), for the third set of participants. Herein, the one or more annotations may be received from the host 112 or from one or more of the first set of electronic devices 104A associated with the first set of participants. For example, the host 112 and the first set of participants may be subject matter experts related to the topic information, while the third set of participants may be guest participants. The annotations associated with the host 112 and/or with the first set of participants may be of lesser interest to the third set of participants or may be sensitive to be further shown to the third set of participants (i.e., guests in the online conference) during the online conference. Hence, the display rights associated with such annotations may be revoked from the third set of participants to keep the annotations of the online conference relevant for the participants (i.e., with higher first expertise score for the topic of the online conference) and to maintain confidentiality of the annotations from guest participants (i.e., the third set of participants).

At 506A, information about the revoke of the annotation display rights may transmitted to the server 108. The circuitry 202 may be configured to transmit the information about the revoke of the annotation display rights from the third set of participants to the server 108. The server 108 may receive the transmitted information from the first electronic device 102 and may administer the online conference based on the received information about the annotations display rights for the third set of participants of the online conference.

At 506B, the information about the revoke of the annotation display rights may be transmitted to the third set of electronic devices 104C. The circuitry 202 may be configured to transmit the information about the revoke of the annotation display rights from the third set of participants to the third set of electronic devices 104C. The third set of participants may be associated with the third set of electronic devices 104C. The third set of electronic devices 104C may receive the information transmitted by the first electronic device 102. The received information may indicate that the third set of participants may be denied permission to view the one or more annotations that may be performed on the media content shared during the online conference. Thus, a display device associated with each of the third set of electronic devices 104C may not display the one or more annotations (especially made by the first set of participants who may be working or associated with the organization similar to that of the host 112 of the online conference.

Figure 6:
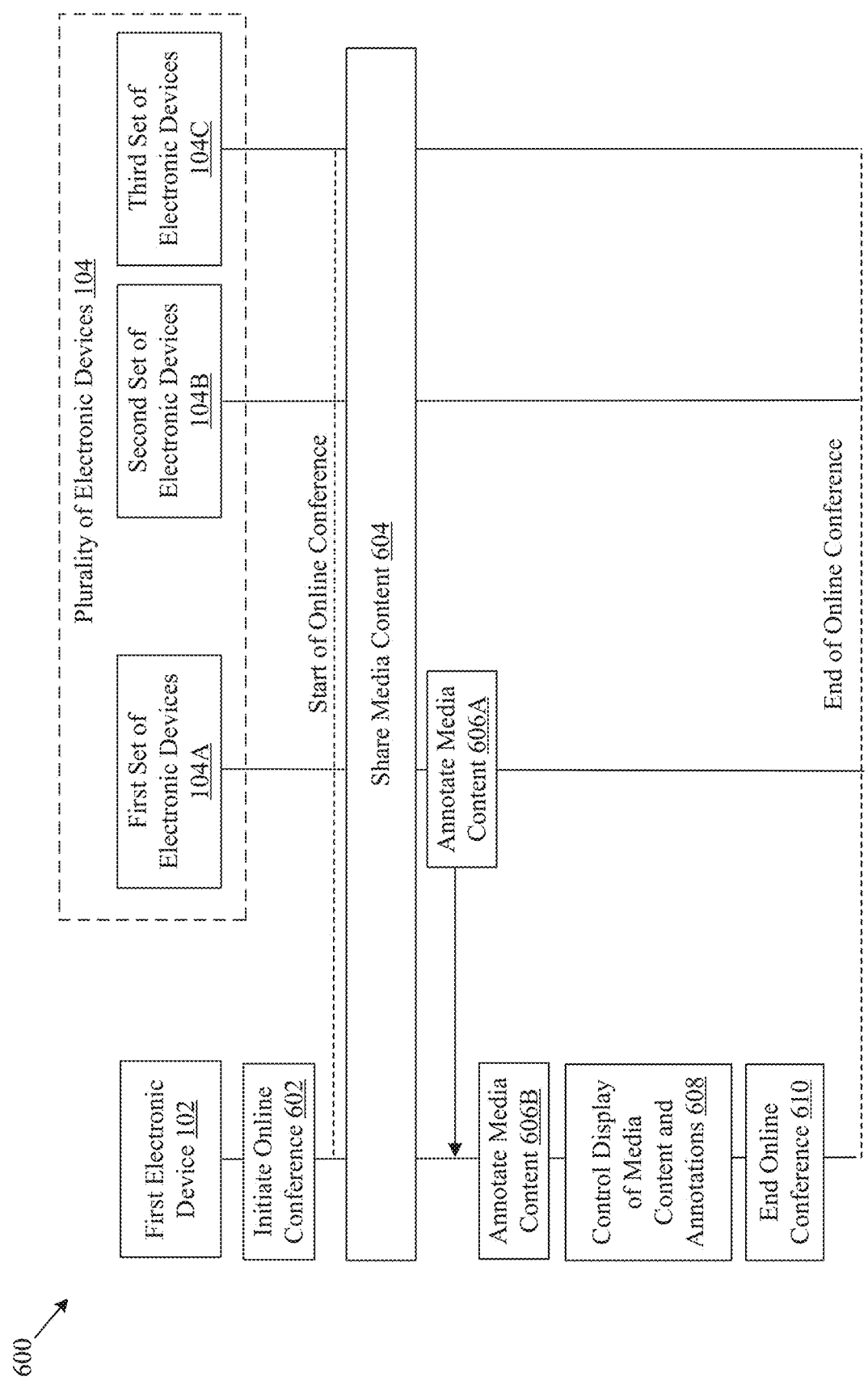
FIG. 6 is a diagram that illustrates exemplary operations to receive and control annotations associated with media content shared in an online conference hosted by the first electronic device of FIG. 2, in accordance with an embodiment of the disclosure.

FIG. 6 is a diagram that illustrates exemplary operations to receive and control annotations associated with an online conference hosted by the first electronic device of FIG. 2, in accordance with an embodiment of the disclosure. FIG. 6 is explained in conjunction with elements from FIG. 1, FIG. 2, FIG. 3, FIG. 4, and FIG. 5. With reference to FIG. 6, there is shown a timeline 600 that illustrates exemplary operations 602, 604, 606A, 606B, 608, and 610. The exemplary operations may be executed to receive and control annotations associated with an online conference. The exemplary operations may be executed by one or more components of FIG. 1, such as, the first electronic device 102, the first set of electronic devices 104A, the second set of electronic devices 104B, and the third set of electronic devices 104C. As described in FIG. 1, the plurality of electronic devices 104 may include the first set of electronic devices 104A, the second set of electronic devices 104B, and the third set of electronic devices 104C. The operation 602 may be executed at the start of the online conference. The operations 602 to 610 may be executed after the initiation of the online conference.

At 602, an online conference may be initiated. The circuitry 202 of the first electronic device 102 may be configured to control an initiation of the online conference with the host 112 and with the plurality of participants 114, based on the permission granted to the first set of participants to annotate media content to be shared during the online conference. For example, the circuitry 202 may receive a user input from the host 112. The user input may include information required to initiate the online conference. For example, the information may include a selection of a hyperlink, or a unique number and a passcode associated with the online conference. Based on the received user input, the circuitry 202 may transmit an instruction associated with the initiation of the online conference to the server 108. On receipt of the instruction from the circuitry 202, the server 108 may start the online conference and admit the host 112 and the plurality of participant 114 to the online conference.

In an embodiment, prior to or at the initiation of the online conference, the circuitry 202 may grant the permission to the first set of participants associated with the first set of electronic devices 104A, to annotate the media content to be shared in the online conference, as described, for example, in FIG. 3. Further, the circuitry 202 may revoke the permission, from the second set of participants associated with the second set of electronic devices 104B, to annotate the media content, as described, for example, in FIG. 4. Also, the circuitry 202 may revoke annotation display rights from the third set of participants associated with the third set of electronic devices 104C, as described, for example, in FIG. 5.

At 604, media content may be shared. In an embodiment, the media content may be shared by one of the host 112 or by a participant of the plurality of participants 114. The media content may be shared after the online conference is initiated. For example, the first electronic device 102 associated with the host 112 may share the media content, in case the media content is shared by the host 112. In another example, an electronic device, of the plurality of electronic devices 104, associated with a participant of the plurality of participants 114 may share the media content during the online conference with the plurality of participants 114. In an embodiment, multiple media content may be shared during online conference by different participants of the plurality of participants 114.

At 606A, the shared media content may be annotated. In an embodiment, an electronic device of the first set of electronic devices 104A may send annotation for a portion of the media content shared in the online conference, based on the grant of the permission to annotate the media content to a participant (from the first set of participants) associated with the electronic device. The particular portion of the media content may be annotated by the participant of the electronic device. The media content (or related portions) may be annotated based on receipt of a user input (i.e., associated with the annotation) from the electronic device of the participant. For example, the user input associated with the annotation may include a highlighting, a point, a line, a circle, an oval, a rectangle, an open shape, a closed shape, an image, a text, a URL, an arrow, or a tick mark associated with a certain portion of the shared media content. In an embodiment, the circuitry 202 of the first electronic device 102 may receive one or more annotations related to the shared media content from a set of electronic devices (e.g., the first set of electronic devices 104A), based on the granted permission for the first set of participants. In an embodiment, the circuitry 202 or the server 108 may not allow the second set of participants (or may not receive from the second set of electronic devices 104B) different annotations for the shared media content, based on the revoke of the permission from the second set of participants as described, for example, in FIG. 4.

At 606B, the shared media content may be annotated. The first electronic device 102 associated with the host 112 may annotate the media content (or annotate a specific portion of the media content) shared in the online conference, based on receipt of a user input (associated with the annotation) from the host 112. For example, the user input associated with the annotation may include, a highlighting, a point, a line, a circle, an oval, a rectangle, an open shape, a closed shape, an image, a text, a URL, an arrow, or a tick mark associated with a certain portion of the shared media content.

At 608, a display of the shared media content and the one or more annotations associated with the shared media content may be controlled. The circuitry 202 may be configured to receive one or more annotations from different electronics devices (i.e., associated with participants who are granted with the permission to annotate the media content). For example, the circuitry 202 may receive the annotations from the first set of electronic devices 104A. The circuitry 202 may be further configured to control the display of the shared media content and the one or more annotations associated with the shared media content on the first display device 212 associated with the first electronic device 102 and on the second display device associated with each of the plurality of electronic devices 104. In an embodiment, the circuitry 202 may enable (or control) the display of the received one or more annotations on the first display device 212, on the second display device associated with each of the first set of electronic devices 104A (i.e. associated with the participants who may have the permission to annotate as described, for example, in FIG. 3), and on the second display device associated with each of the second set of electronic devices 104B (i.e. associated with the participants who may not have the permission to annotate as described, for example, in FIG. 4). The circuitry 202 may enable the display of the shared media content on each of the first display device 212, and on the second display device associated with each of the first set of electronic devices 104A, the second set of electronic devices 104B, and the third set of electronic devices 104C. Thus, the one or more annotations may be displayed on the first display device 212 related to the host 112 and on the second display device of each of the first set of electronic devices 104A and the second set of electronic devices 104B. However, the one or more annotations may not be displayed on the second display device of each of the third set of electronic devices 104C (related to the third set of participants who join the online conference as the guests as described, for example, in FIG. 5). Thus, the circuitry 202 may control the display of the one or more annotations (i.e. made by the first set of participants on the shared media content) on the second display device associated with each of the third set of participants.

In an embodiment, the circuitry 202 may be configured to determine a time of receipt of each of the one or more annotations (for example received from the host 112 or from the first set of electronic devices 104A). For example, the circuitry 202 may record a timestamp of receipt of each of the one or more annotations associated with the host 112 and the first set of participants. The circuitry 202 may control (i.e., during the online conference) a display of the received one or more annotations (i.e., made on different portions of the shared media content), on each of the first display device 212 associated with the first electronic device 102 and on the second display device associated with each of the first set of electronic devices 104A and the second set of electronic devices 104B. The display of the received one or more annotations may be controlled based on the determined time of receipt of each of the one or more annotations. For example, the circuitry 202 may record a timestamp of the receipt of an annotation. The annotation may be displayed on the first display device 212 and/or the second display devices associated with each of the first set of electronic devices 104A and the second set of electronic devices 104B up to a predetermined time (e.g., for certain seconds or minutes) after the recorded timestamp of the annotation. After the lapse of the predetermined time, the received annotation may disappear from a specific portion of the shared media content where the annotation was made by the permitted participant. Such display control of the annotation may help the participant to easily view newly made annotation by different participants. Therefore, the circuitry 202 may control the display of all the annotations made by different permitted participants as per the recorded timestamp of corresponding annotations. Details associated with control of display of overlapped annotations are described, for example, in FIG. 7.

In an embodiment, the circuitry 202 may be configured to generate log information of each of the one or more annotations received from the host 112 or the first set of participants who may be permitted to annotate the media content before the start of the online conference. The log information may be generated for all the annotations received during the completion duration of the online conference. The log information may include, but is not limited to, a type of annotation (for example, a point, a highlighting, a line, a circle, an oval, a rectangle, an open shape, a closed shape, an image, a text, a URL, an arrow, or a tick mark), a performer/participant of the annotation, a timestamp of reception of the annotation, a portion of the shared media content associated with the timestamp, and an electronic device from which the annotation is received. The circuitry 202 may be further configured to generate a timeline of the received one or more annotations for each of the first set of participants and/or the host 112, based on the generated log information. The timeline corresponding to a participant may indicate one or more timestamps at which the participant provided user inputs corresponding to annotations, a type of annotation performed at each timestamp, a portion of the media content associated with each timestamp, and an electronic device used to perform the annotation. The circuitry 202 of the first electronic device 102 may be further configured to control a display of the generated timeline for each of the first set of participants or for the host 112 on the first display device 212 and on the second display device associated with each of the first set of electronic devices 104A and the second set of electronic devices 104B. Thus, the timeline associated with each of the one or more annotations (i.e., received during the online conference) may be displayed on the first display device 212 for the host 112 and for the plurality of participants 114 on the second display device associated with each of the first set of electronic devices 104A and the second set of electronic devices 104B.

At 610, the online conference may be ended. In an embodiment, the circuitry 202 may be configured to initiate an end of the online conference established between the first electronic device 102 and the plurality of electronic devices 104. For example, the circuitry 202 may transmit information indicative of instructions to end the online conference to the server 108. Thereafter, the first electronic device 102 may disconnect from the online conference. Based on receipt of the information, the server 108 may be configured to forward the instructions to end the online conference to the plurality of electronic devices 104. On receipt of the instructions to end the online conference by the plurality of electronic devices 104, the plurality of electronic devices 104 may also disconnect from the online conference. The online conference may further end when all the participants (including the host 112) and/or related electronic devices associated with the online conference are disconnected from the online conference.

Typically, during an online conference, a participant who desires to annotate shared media content may be required to manually request the host 112 (or a presenter, or a moderator) of the online conference for a permission to annotate the media content. The host 112, (or the presenter, or the moderator) may have to individually grant a permission (during the online conference) to each such participant to annotate the shared media content. Conventionally, the virtual presence software or application may include user interface (UI) elements (like multiple layers of menus and sub-menus), that may enable the participant to request for the permission and/or may enable the host 112, the presenter, or the moderator to grant the permission to each such participant. As the host 112 (or the presenter, or the moderator) may be required to navigate UI elements (like multiple menus and sub-menus) and individually grant the permissions to each participant who desires to annotate the media content, the conventional methods to grant the permission during the online conference may be laborious and time consuming. On the other hand, the disclosed first electronic device 102 may automatically grant permissions to annotate the media content to the first set of participants of the online conference either prior to the start of the online conference or when the set of participants join the online conference. The first electronic device 102 may not require the participants to navigate through UI elements (like multiple menus) of the virtual presence software or application, during the online conference, to seek the permission to annotate the media content. Thus, the participant may not miss out on any portion of the media content that may be shared during the online conference. Also, as the presenter or the host 112 may not be required to grant the permissions to each participant individually during the online conference, the presenter or host 112 may not be interrupted while the media content is shared. In addition, as the profile information 116 of the individual participants may be used to grant the permission (or revoke the permission, or revoke annotation display rights), the process of the grant of the permissions (or revoke the permission, or revoke annotation display rights) may be automated and may require minimal or no input from the host 112 or the presenter. Thus, using the disclosed first electronic device 102, an administration of the annotation permission may be streamlined, and time/effort required to grant the permission to the participants (or revoke the permission or revoke the annotation display rights from the participants) may be reduced significantly.

Figure 7:
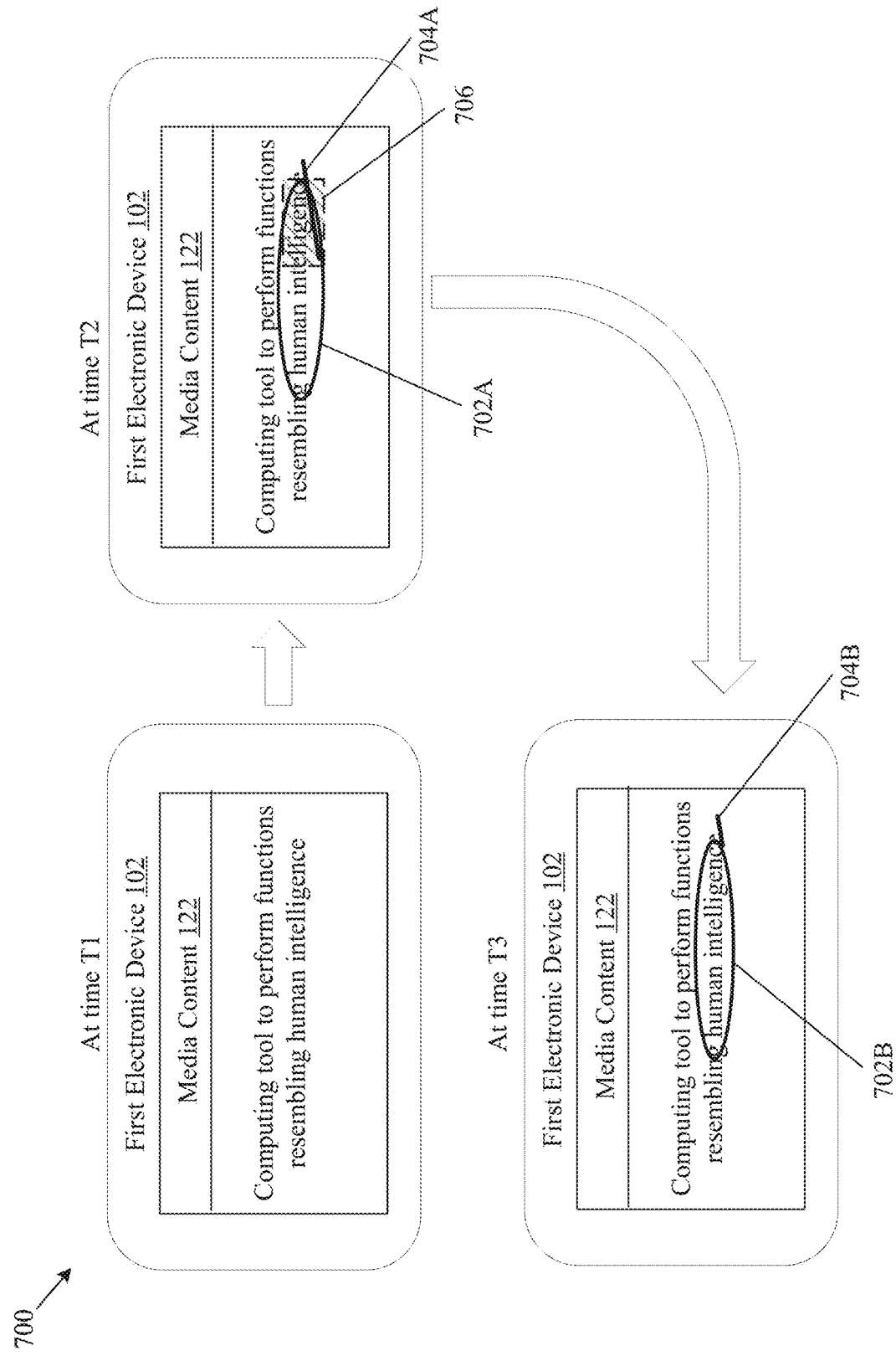
FIG. 7 is a diagram that illustrates an exemplary scenario of display of one or more annotations associated with an online conference on an electronic device, in accordance with an embodiment of the disclosure.

FIG. 7 is a diagram that illustrates an exemplary scenario of display of one or more annotations associated with an online conference on an electronic device, in accordance with an embodiment of the disclosure. FIG. 7 is explained in conjunction with elements from FIGS. 1, 2, 3, 4, 5, and 6. With reference to FIG. 7, there is shown an exemplary scenario 700. The scenario 700 indicates the first electronic device 102 and the media content 122 that may be shared in an online conference hosted by the host 112 associated with the first electronic device 102.

As shown in FIG. 7, at a first time instance "T1", the media content 122 may be displayed though the UI element 118 (not shown in FIG. 7). At the first time instance "T1", the media content 122 may not be annotated by the plurality of participants 114. In other words, the circuitry 202 may not have received the one or more annotations from any of the first set of participants or from the host 112 until the first time instance "T1". At a second time instance "12" after the first time instance "T1", the circuitry 202 may receive the one or more annotations (from the first set of participants) including a first annotation (such as, an encircling of the word "human intelligence") and a second annotation (such as, a partial underlining of the word "intelligence") as shown, for example, in FIG. 7.

In an embodiment, the circuitry 202 may be configured to determine a first display position 702A of the first annotation, on the first display device 212. For example, the first display position 702A may correspond to one or more first pixel coordinates on a display screen of the first display device 212. The circuitry 202 may determine one or more first pixel coordinates to be occupied by the first annotation provided by a permitted participant during the online conference. The circuitry 202 may be further configured to determine a second display position 704A of the second annotation on the first display device 212. For example, the second display position 704A may correspond to one or more second pixel coordinates of the display screen of the first display device 212. The circuitry 202 may determine one or more second pixel coordinates to be occupied by the second annotation. The second display position 704A (i.e., to display second annotation) may be different from the first display position 702A to display the first annotation. In some embodiments, the first display position 702A and the second display position 704A of the first annotation and the second annotation may be substantially similar (or overlapped), as different permitted participants of the first annotation and the second annotation may annotate on same portion of the shared media content 122, respectively (as shown in FIG. 7 at second time instance "12").

The circuitry 202 may be further configured to determine a region of overlap 706 of the first annotation with the second annotation on the first display device 212, based on the determined first display position 702A and the determined second display position 704A. For example, the circuitry 202 may determine the region of overlap 706 based on a comparison between the one or more first pixel coordinates and the one or more second pixel coordinates. The circuitry 202 may determine the region of overlap 706 based on a percentage of pixel match between the one or more first pixel coordinates and the one or more second pixel coordinates. For example, the percentage of pixel match may be 100%, in case the first annotation and the second annotation occupy same pixel coordinates. In such example, the second annotation may completely overlap the first annotation in a scenario where the second annotation may be received at a later timestamp as compared to the receipt of the first annotation.

The circuitry 202 may be further configured to control a display of at least one of the first annotation or the second annotation on the first display device 212 and on the second display device of each of the first set of electronic devices 104A and the second set of electronic devices 104B, based on the determined region of overlap 706. The circuitry 202 may use a threshold percentage of pixel match to determine whether at least one of the first annotation or the second annotation is to be displayed on the first display device 212 and on the second display device of each of the first set of electronic devices 104A and the second set of electronic devices 104B, or not. For example, the threshold percentage of pixel match may be 75%. In such case, the circuitry 202 may not display either the first annotation or the second annotation on the first display device 212 and on the second display device of each of the first set of electronic devices 104A and the second set of electronic devices 104B, if the percentage of pixel match of the first annotation and the second annotation exceeds the threshold percentage of pixel match (i.e., 75%). As an example, in case the first annotation is received prior to the second annotation and the percentage of pixel match exceeds the threshold percentage of pixel match, then the circuitry 202 may display the first annotation and hide the second annotation.

As shown in FIG. 7, for example, the region of overlap 706 may cover more than the threshold percentage of pixel match (e.g., 75%) of the first annotation and the second annotation. At a third time instance "13" after the second time instance "12", the circuitry 202 may display the first annotation at a display position 702B, which may be same as the first display position 702A. For example, the first annotation may be displayed completely as shown in FIG. 7. Further, the circuitry 202 may display only a portion (for example, a portion of non-overlap between the first annotation and the second annotation) of the second annotation at a display position 704B. In some embodiments, based on the determination that the region of overlap 706 is equal or more than the threshold percentage of pixel match, then the circuitry 202 may control (i.e., slightly adjust or move) the second display position 704A of the second annotation, such that the region of overlap 706 becomes significantly lesser than the threshold percentage of pixel match. In an example, the region of overlap 706 of the first annotation with the second annotation (after the control of the second display position 704A) may be zero (i.e., non-overlapping) or less than 10% overlap on the first display device 212. Thus, the disclosed first electronic device 102 ensures that the provided annotations are controlled to be displayed at non-overlapping display regions (i.e., especially when multiple annotations overlap with each other to certain extent). It should be noted that the exemplary scenario 700 of FIG. 7 is for exemplary purpose and should not be construed to limit the scope of the disclosure.

Figure 8:
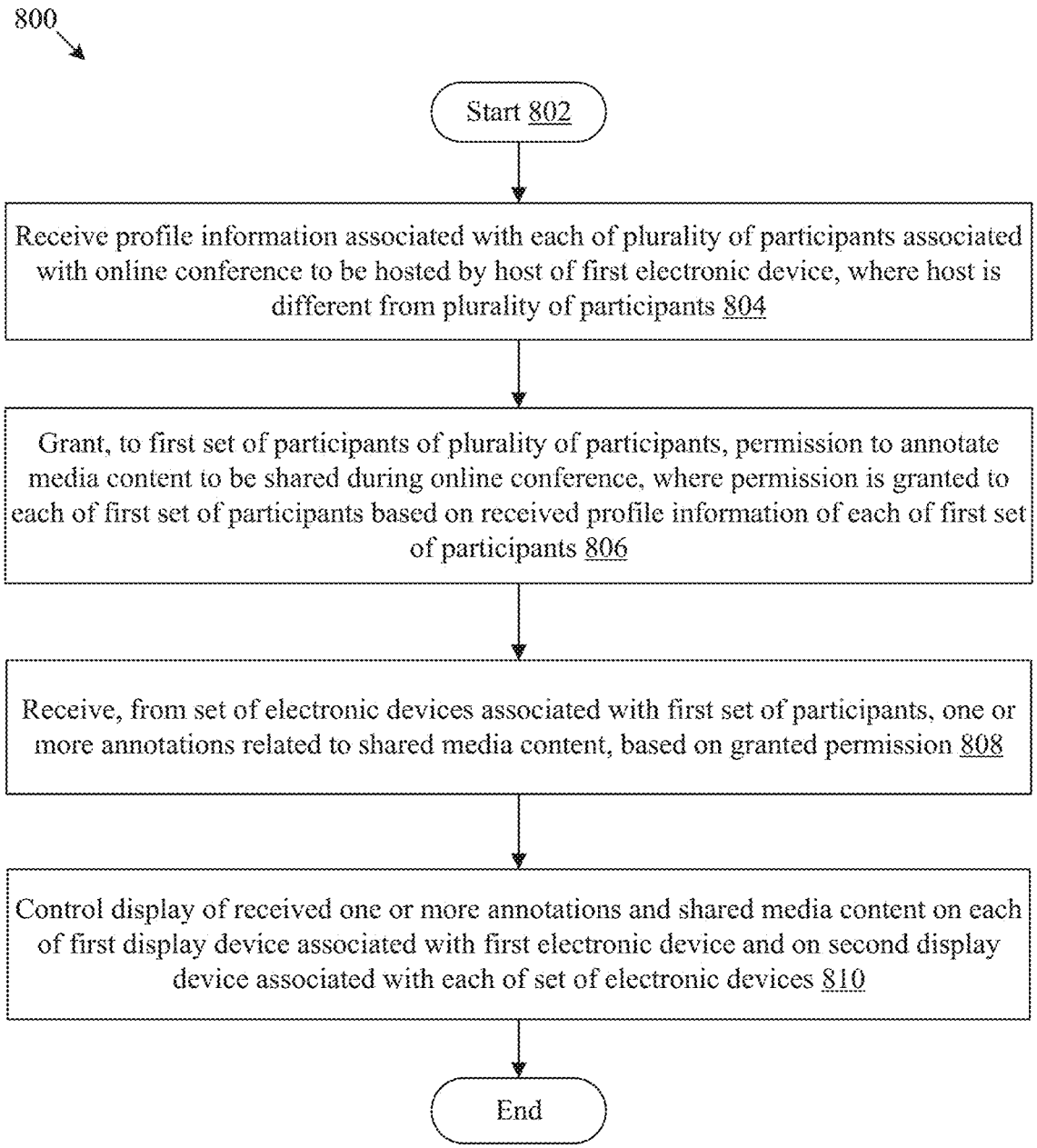
FIG. 8 is a flowchart that illustrates exemplary operations for control of permissions associated with annotations in an online conference, in accordance with an embodiment of the disclosure.

FIG. 8 is a flowchart that illustrates exemplary operations for control of permissions associated with annotations in an online conference, in accordance with an embodiment of the disclosure. FIG. 8 is explained in conjunction with elements from FIGS. 1, 2, 3, 4, 5, 6, and 7. With reference to FIG. 8, there is shown a flowchart 800. The operations from 802 to 810 may be implemented by any computing system, such as by the first electronic device 102 of FIG. 1 or the circuitry 202 of FIG. 2. The operations may start at 802 and may proceed to 804.

At 804, the profile information 116 associated with each of the plurality of participants 114, who may be associated with an online conference to be hosted by the host 112 associated with the first electronic device 102, may be received, where the host 112 is different from the plurality of participants 114. In an embodiment, the circuitry 202 may be configured to receive the profile information 116 associated with each of the plurality of participants 114. The profile information 116 associated with each of the plurality of participants 114 may be received from the database 106 or from the server 108, as described, for example, in FIGS. 3, 4, and 5.

At 806, a permission to annotate media content to be shared during the online conference may be granted to the first set of participants of the plurality of participants 114 where the permission may be granted based on the received profile information 116 of each of the first set of participants. In an embodiment, the circuitry 202 may be configured to grant, to the first set of participants of the plurality of participants 114, the permission to annotate the media content to be shared during the online conference. Herein, the permission may be granted to each of the first set of participants based on the received profile information 116 of each of the first set of participants. The details of the grant of permission to annotate the media content to be shared during the online conference, based on the received profile information 116 are described, for example, in FIG. 3.

At 808, one or more annotations related to the shared media content may be received from a set of electronic devices associated with the first set of participants, based on the granted permission. In an embodiment, the circuitry 202 may be configured to receive, from the set of electronic devices (e.g., the first set of electronic devices 104A) associated with the first set of participants, the one or more annotations related to the shared media content, based on the granted permission as described, for example, in FIG. 6.

At 810, a display of the received one or more annotations and the shared media content may be controlled on each of the first display device 212 associated with the first electronic device 102 and on a display device associated with each of the set of electronic devices. In an embodiment, the circuitry 202 may be configured to control the display of the received one or more annotations and the shared media content on each of the first display device 212 associated with the first electronic device 102 and on the display device (i.e., the second display device) associated with each of the set of electronic devices (e.g., the first set of electronic devices 104A) as described, for example, in FIG. 6. Control may pass to end.

Although the flowchart 800 is illustrated as discrete operations, such as 804, 806, 808, and 810 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic device (such as the first electronic device 102). The instructions may cause the machine and/or computer to perform operations that include reception of the profile information 116 associated with each of the plurality of participants 114 who may be associated with an online conference to be hosted by the host 112 associated with the first electronic device 102. The host 112 may be different from the plurality of participants 114. The operations may further include grant, to a first set of participants of the plurality of participants 114, a permission to annotate media content to be shared during the online conference. The permission may be granted to each of the first set of participants based on the received profile information 116 of each of the first set of participants. The operations may further include reception, from a set of electronic devices (e.g., the first set of electronic devices 104A) associated with the first set of participants, one or more annotations related to the shared media content, based on the granted permission. The operations may further include control of a display of the received one or more annotations and the shared media content on each of a first display device 212 associated with the first electronic device 102 and on a second display device associated with each of the set of electronic devices.

Exemplary aspects of the disclosure may include a first electronic device (such as, the first electronic device 102 of FIG. 1) that may include circuitry (such as, the circuitry 202), that may be communicatively coupled to a plurality of electronic devices (such as, the plurality of electronic devices 104 of FIG. 1). The first electronic device 102 may further include memory (such as, the memory 204 of FIG. 2). The circuitry 202 may be configured to receive the profile information 116 associated with each of a plurality of participants 114 who may be associated with an online conference to be hosted by the host 112 associated with the first electronic device 102. The host 112 may be different from the plurality of participants 114. The profile information 116 associated with each of the plurality of participants 114 may include at least one of information about an employment in an organization, information about a role or designation in an organization, social media profile information, experience information, skillset information, information about a number of followers on a social media, research paper publication information, information associated with membership in a social group, history information associated with content sharing permissions, or history information associated with content annotation permissions. The circuitry 202 may be further configured to grant, to a first set of participants of the plurality of participants 114, a permission to annotate media content to be shared during the online conference. The permission may be granted to each of the first set of participants based on the received profile information 116 of each of the first set of participants. The media content may be shared by one of the host 112 or by a participant of the plurality of participants 114 during the online conference. The circuitry 202 may be further configured to receive, from a set of electronic devices (e.g., the first set of electronic devices 104A) associated with the first set of participants, one or more annotations related to the shared media content, based on the granted permission. The circuitry 202 may be further configured to control a display of the received one or more annotations and the shared media content on each of the first display device 212 associated with the first electronic device 102 and on a second display device associated with each of the set of electronic devices (e.g., the first set of electronic devices 104A).

In accordance with an embodiment, the circuitry 202 may be configured to control an initiation of the online conference with the host 112 and with the plurality of participants 114, based on the granted permission to the first set of participants. The circuitry 202 may be further configured to receive, from the set of electronic devices (e.g., the first set of electronic devices 104A), the one or more annotations related to the media content shared during the initiated online conference.

In accordance with an embodiment, the circuitry 202 may be configured to determine a first expertise score associated with the host 112 based on first profile information associated with the host 112. The circuitry 202 may be further configured to determine a second expertise score associated with each of the plurality of participants 114 based on the received profile information 116 associated with each of the plurality of participants 114. The circuitry 202 may be further configured to compare the determined first expertise score with the determined second expertise score associated with each of the plurality of participants 114. The circuitry 202 may be further configured to select the first set of participants from the plurality of participants 114, based on the comparison.

In accordance with an embodiment, the circuitry 202 may be further configured to receive topic information associated with the media content. The circuitry 202 may be further configured to apply the neural network model 210 on the received topic information and on the received profile information 116 associated with each of the plurality of participants 114. The circuitry 202 may be further configured to select the first set of participants from the plurality of participants 114 based on the application of the neural network model 210 on the received topic information and on the received profile information.

In accordance with an embodiment, the circuitry 202 may be further configured to control the first display device 212, associated with the first electronic device 102, to display a recommendation to grant the permission to the selected first set of participants. The circuitry 202 may be further configured to receive a first user input indicative of a confirmation to grant the permission to the selected first set of participants, based on the displayed recommendation. The circuitry 202 may be further configured to grant, to the first set of participants, the permission to annotate the media content based on the received first user input.

In accordance with an embodiment, the circuitry 202 may be further configured to select a second set of participants from the plurality of participants 114 based on the application of the neural network model 210 on the received topic information and on the received profile information 116 associated with each of the plurality of participants 114. Herein, the first set of participants may include the second set of participants. The second set of participants may include one or more participants who may be observers associated with the online conference. The circuitry 202 may be further configured to revoke, from the second set of participants, the permission to annotate the media content.

In accordance with an embodiment, the circuitry 202 may be further configured to select the second set of participants from the plurality of participants 114 based on the application of the neural network model 210 on the received topic information and on the received profile information 116 associated with each of the plurality of participants 114. Herein, the first set of participants may include the second set of participants. The circuitry 202 may be further configured to control the first display device 212, associated with the first electronic device 102, to display a recommendation to revoke the permission from the selected second set of participants. The circuitry 202 may be further configured to receive a second user input indicative of a confirmation to revoke the permission from the selected second set of participants, based on the displayed recommendation. The circuitry 202 may be further configured to revoke, from the second set of participants, the permission to annotate the media content based on the received second user input.

In accordance with an embodiment, the circuitry 202 may be further configured to select a third set of participants from the plurality of participants 114 based on the application of the neural network model 210 on the received profile information 116 associated with each of the plurality of participants 114. The third set of participants may include one or more participants who may be guest participants associated with the online conference. The circuitry 202 may be further configured to control the display of the one or more annotations, on the media content, on a display device associated with each of the third set of participants.

In accordance with an embodiment, the circuitry 202 may be further configured to control the first display device 212 to display the received profile information 116 associated with each of the plurality of participants 114. The circuitry 202 may be further configured to receive a third user input indicative of a selection of the first set of participants from the plurality of participants 114, based on the displayed profile information 116 associated with each of the plurality of participants 114. The circuitry 202 may be further configured to grant, to the first set of participants, the permission to annotate the media content, based on the received third user input.

In accordance with an embodiment, the circuitry 202 may be further configured to control the first display device 212 to display the received profile information 116 associated with each of the plurality of participants 114. The circuitry 202 may be further configured to receive a fourth user input indicative of a selection of a second set of participants from the plurality of participants 114, based on the displayed profile information 116 associated with each of the plurality of participants 114. Herein, the first set of participants may include the second set of participants. The circuitry 202 may be further configured to revoke, from the second set of participants, the permission to annotate the media content, based on the received fourth user input.

In accordance with an embodiment, the circuitry 202 may be further configured to determine a time of receipt of each of the one or more annotations. The circuitry 202 may be further configured to control a display of the received one or more annotations on the shared media content on each of the first display device 212 associated with the first electronic device 102 and on the second display device associated with each of the set of electronic devices, based on the determined time of receipt.

In accordance with an embodiment, the circuitry 202 may be further configured to determine a first display position of a first annotation, from the received one or more annotations, on the first display device 212. The circuitry 202 may be further configured to determine a second display position of a second annotation, from the received one or more annotations, on the first display device 212. The circuitry 202 may be further configured to determine a region of overlap of the first annotation with the second annotation on the first display device 212, based on the determined first display position and the determined second display position. The circuitry 202 may be further configured to control a display of at least one of the first annotation or the second annotation on the first display device 212 and on each of the display devices associated with the set of electronic devices, based on the determined region of overlap.

In accordance with an embodiment, the circuitry 202 may be further configured to control a display of the received one or more annotations on the display device associated with one or more of the set of electronic devices, based on the granted permission to the first set of participants to annotate the media content.

In accordance with an embodiment, the circuitry 202 may be further configured to generate log information of each of the received one or more annotations. The circuitry 202 may be further configured to generate a timeline of the received one or more annotations for each of the first set of participants, based on the generated log information. The circuitry 202 may be further configured to control a display of the generated timeline for each of the first set of participants on the first display device 212 and on each of the display devices associated with the set of electronic devices.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A first electronic device, comprising:
circuitry configured to:
receive profile information associated with each of a plurality of participants who are associated with an online conference to be hosted by a host of the first electronic device, wherein the host is different from the plurality of participants;
control, a first display device associated with the first electronic device, to display the received profile information associated with each of the plurality of participants;
receive a first user input indicative of a selection of a first set of participants from the plurality of participants, based on the displayed profile information associated with each of the plurality of participants;
grant, to the first set of participants of the plurality of participants, a permission to annotate media content to be shared during the online conference, wherein the permission is granted to each of the first set of participants based on the received first user input;
receive, from a set of electronic devices associated with the first set of participants, at least one annotation related to the shared media content, based on the granted permission; and
control a display of the received at least one annotation and the shared media content on each of the first display device and on a second display device associated with each of the set of electronic devices.

2. The first electronic device according to claim 1, wherein the profile information associated with each of the plurality of participants includes at least one of information about an employment in an organization, information about a role or designation in an organization, social media profile information, experience information, skillset information, information about a number of followers on a social media, research paper publication information, information associated with membership in a social group, history information associated with content sharing permissions, or history information associated with content annotation permissions.

3. The first electronic device according to claim 1, wherein the media content is shared by one of the host or by a participant of the plurality of participants.

4. The first electronic device according to claim 1, wherein the circuitry is further configured to:
control an initiation of the online conference with the host and with the plurality of participants, based on the granted permission to the first set of participants; and receive, from the set of electronic devices, the at least one annotation related to the media content shared during the initiated online conference.

5. The first electronic device according to claim 1, wherein the circuitry is further configured to:
   determine a first expertise score associated with the host based on first profile information associated with the host;
   determine a second expertise score associated with each of the plurality of participants based on the received profile information associated with each of the plurality of participants;
   compare the determined first expertise score with the determined second expertise score associated with each of the plurality of participants; and
   select the first set of participants from the plurality of participants, based on the comparison.

6. The first electronic device according to claim 1, wherein the circuitry is further configured to:
   receive topic information associated with the media content;
   apply a neural network model on the received topic information and on the received profile information associated with each of the plurality of participants; and
   select the first set of participants from the plurality of participants based on the application of the neural network model on the received topic information and on the received profile information.

7. The first electronic device according to claim 6, wherein the circuitry is further configured to:
   control the first display device, associated with the first electronic device, to display a recommendation to grant the permission to the selected first set of participants;
   receive a second user input indicative of a confirmation to grant the permission to the selected first set of participants, based on the displayed recommendation; and
   based on the received second user input, grant to the first set of participants, the permission to annotate the media content.

8. The first electronic device according to claim 6, wherein the circuitry is further configured to:
   select a second set of participants from the plurality of participants based on the application of the neural network model on the received topic information and on the received profile information associated with each of the plurality of participants, wherein the first set of participants includes the second set of participants; and
   revoke, from the second set of participants, the permission to annotate the media content.

9. The first electronic device according to claim 8, wherein the second set of participants include at least one participant who are observers associated with the online conference.

10. The first electronic device according to claim 6, wherein the circuitry is further configured to:
    select a second set of participants from the plurality of participants based on the application of the neural network model on the received topic information and on the received profile information associated with each of the plurality of participants, wherein the first set of participants includes the second set of participants;
    control the first display device, associated with the first electronic device, to display a recommendation to revoke the permission from the selected second set of participants;
    receive a second user input indicative of a confirmation to revoke the permission from the selected second set of participants, based on the displayed recommendation; and
    based on the received second user input, revoke from the second set of participants, the permission to annotate the media content.

11. The first electronic device according to claim 6, wherein the circuitry is further configured to:
    select a second set of participants from the plurality of participants based on the application of the neural network model on the received profile information associated with each of the plurality of participants; and
    control the display of the at least one annotation, on the media content, on a display device associated with each of the second set of participants.

12. The first electronic device according to claim 11, wherein the second set of participants include at least one participant who is a guest participant associated with the online conference.

13. The first electronic device according to claim 1, wherein the circuitry is further configured to:
    control the first display device to display the received profile information associated with each of the plurality of participants;
    receive a second user input indicative of a selection of a second set of participants from the plurality of participants, based on the displayed profile information associated with each of the plurality of participants, wherein the first set of participants includes the second set of participants; and
    revoke, from the second set of participants, the permission to annotate the media content, based on the received second user input.

14. The first electronic device according to claim 1, wherein the circuitry is further configured to:
    determine a time of receipt of each of the at least one annotation; and
    control a display of the received at least one annotation on the shared media content on each of the first display device associated with the first electronic device and on the second display device associated with each of the set of electronic devices, based on the determined time of receipt.

15. The first electronic device according to claim 1, wherein the circuitry is further configured to:
    determine a first display position of a first annotation, from the received at least one annotation, on the first display device;
    determine a second display position of a second annotation, from the received at least one annotation, on the first display device;
    determine a region of overlap of the first annotation with the second annotation on the first display device, based on the determined first display position and the determined second display position; and
    control a display of at least one of the first annotation or the second annotation on the first display device and on the second display device associated with each of the set of electronic devices, based on the determined region of overlap.

16. The first electronic device according to claim 1, wherein the circuitry is further configured to control a display of the received at least one annotation on the display device associated with at least one of the set of electronic devices, based on the granted permission to the first set of participants to annotate the media content.

17. The first electronic device according to claim 1, wherein the circuitry is further configured to:
- generate log information of each of the received at least one annotations;
- generate a timeline of the received at least one annotation for each of the first set of participants, based on the generated log information; and
- control a display of the generated timeline for each of the first set of participants on the first display device and on the second display device associated with each of the set of electronic devices.

18. A method, comprising:
in a first electronic device:
- receiving profile information associated with each of a plurality of participants who are associated with an online conference to be hosted by a host of the first electronic device, wherein the host is different from the plurality of participants;
- controlling, a first display device associated with the first electronic device, to display the received profile information associated with each of the plurality of participants;
- receiving a user input indicative of a selection of a first set of participants from the plurality of participants, based on the displayed profile information associated with each of the plurality of participants;
- granting, to the first set of participants of the plurality of participants, a permission to annotate media content to be shared during the online conference, wherein the permission is granted to each of the first set of participants based on the received user input;
- receiving, from a set of electronic devices associated with the first set of participants, at least one annotation related to the shared media content, based on the granted permission; and
- controlling a display of the received at least one annotation and the shared media content on each of the first display device and on a second display device associated with each of the set of electronic devices.

19. A non-transitory computer-readable medium having stored thereon, computer-executable instructions that when executed by a first electronic device, causes the first electronic device to execute operations, the operations comprising:
- receiving profile information associated with each of a plurality of participants who are associated with an online conference to be hosted by a host of the first electronic device, wherein the host is different from the plurality of participants;
- controlling, a first display device associated with the first electronic device, to display the received profile information associated with each of the plurality of participants;
- receiving a user input indicative of a selection of a first set of participants from the plurality of participants, based on the displayed profile information associated with each of the plurality of participants;
- granting, to the first set of participants of the plurality of participants, a permission to annotate media content to be shared during the online conference, wherein the permission is granted to each of the first set of participants based on the received user input;
- receiving, from a set of electronic devices associated with the first set of participants, at least one annotation related to the shared media content, based on the granted permission; and
- controlling a display of the received at least one annotation and the shared media content on each of the first display device and on a second display device associated with each of the set of electronic devices.

* * * * *